United States Patent
Dumitras et al.

(10) Patent No.: US 7,809,207 B2
(45) Date of Patent: *Oct. 5, 2010

(54) PRE-PROCESSING METHOD AND SYSTEM FOR DATA REDUCTION OF VIDEO SEQUENCES AND BIT RATE REDUCTION OF COMPRESSED VIDEO SEQUENCES USING SPATIAL FILTERING

(75) Inventors: Adriana Dumitras, Sunnyvale, CA (US); James Oliver Normile, Los Altos, CA (US); Ryan R. Salsbury, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/185,777

(22) Filed: Aug. 4, 2008

(65) Prior Publication Data

US 2008/0292201 A1   Nov. 27, 2008

Related U.S. Application Data

(63) Continuation of application No. 10/640,944, filed on Aug. 13, 2003, now Pat. No. 7,430,335.

(51) Int. Cl.
*G06K 9/40* (2006.01)
*G06K 9/36* (2006.01)
*H04N 7/12* (2006.01)

(52) U.S. Cl. .................. 382/260; 382/232; 375/240.29

(58) Field of Classification Search ......... 382/232–233, 382/260–264, 274–275, 103, 282; 348/14.08, 348/14.13; 345/691, 694; 375/240.29, 254
See application file for complete search history.

(56) References Cited

U.S. PATENT DOCUMENTS 4,684,983 A   8/1987   Acampora et al.

(Continued)

FOREIGN PATENT DOCUMENTS

AU   1078602   4/2002

(Continued)

OTHER PUBLICATIONS

U.S. Appl. No. 12/140,254, filed Jun. 16, 2008, Dumitras, et al.

(Continued)

*Primary Examiner*—Kanji Patel
(74) *Attorney, Agent, or Firm*—Adeli & Tollen LLP

(57) ABSTRACT

Methods for pre-processing video sequences prior to compression to provide data reduction of the video sequence. Also, after compression of the pre-processed video sequence, the bit rate of the pre-processed and compressed video sequence will be lower than the bit rate of the video sequence after compression but without pre-processing. Pre-processing may include spatial anisotropic diffusion filtering such as Perona-Malik filtering, Fallah-Ford filtering, or omni-directional filtering that extends Perona-Malik filtering to perform filtering in at least one diagonal direction. Pre-processing may also include performing filtering differently on a foreground region than on a background region of a video frame. This method includes identifying pixel locations having pixel values matching characteristics of human skin and determining a bounding shape for each contiguous grouping of matching pixel locations. The foreground region is comprised of pixel locations contained in a bounding shape and the background region is comprised of all other pixel locations.

32 Claims, 11 Drawing Sheets

U.S. PATENT DOCUMENTS

| | | | |
|---|---|---|---|
| 5,446,502 A | 8/1995 | Lebowsky | |
| 5,576,837 A | 11/1996 | Strolle et al. | |
| 5,589,890 A | 12/1996 | Mancuso et al. | |
| 5,715,325 A * | 2/1998 | Bang et al. | 382/118 |
| 5,838,299 A | 11/1998 | Smith et al. | |
| 6,005,626 A | 12/1999 | Ding | |
| 6,108,455 A | 8/2000 | Mancuso | |
| 6,281,942 B1 | 8/2001 | Wang | |
| 6,456,328 B1 | 9/2002 | Okada | |
| 6,592,523 B2 * | 7/2003 | Avinash et al. | 600/443 |
| 6,731,800 B1 * | 5/2004 | Barthel et al. | 382/176 |
| 6,731,821 B1 | 5/2004 | Maurer | |
| 6,738,424 B1 | 5/2004 | Allmen et al. | |
| 6,785,402 B2 * | 8/2004 | Jouppi et al. | 382/103 |
| 6,870,945 B2 * | 3/2005 | Schoepflin et al. | 382/103 |
| 6,912,313 B2 * | 6/2005 | Li | 382/219 |
| 7,076,113 B2 | 7/2006 | Le Dinh | |
| 7,080,065 B1 | 7/2006 | Kothuri et al. | |
| 7,177,483 B2 * | 2/2007 | Saund | 382/282 |
| 7,397,886 B2 * | 7/2008 | Avinash et al. | 378/5 |
| 7,403,568 B2 | 7/2008 | Dumitras et al. | |
| 7,430,335 B2 | 9/2008 | Dumitras et al. | |
| 2005/0018077 A1 | 1/2005 | De Haan et al. | |
| 2005/0036704 A1 | 2/2005 | Dumitras et al. | |
| 2008/0284904 A1 | 11/2008 | Dumitras et al. | |
| 2008/0292006 A1 | 11/2008 | Dumitras et al. | |

FOREIGN PATENT DOCUMENTS

| | | |
|---|---|---|
| DE | 69826155 | 10/2004 |
| EP | 0853436 | 7/1998 |
| EP | 0863671 | 9/1998 |
| EP | 1320987 | 6/2003 |
| JP | 10229505 | 8/1998 |
| JP | 11008855 | 1/1999 |
| WO | WO 2005020584 | 3/2005 |

OTHER PUBLICATIONS

U.S. Appl. No. 12/107,072, filed Apr. 21, 2008, Dumitras, et al.

Restriction Requirement for U.S. Appl. No. 10/640,944, Mar. 22, 2007 (mailing date), Dumitras, et al.

Non-Final Office Action for U.S. Appl. No. 10/640,944, Jul. 25, 2007 (mailing date), Dumitras, et al.

Response to Non-Final Office Action for U.S. Appl. No. 10/640,944, Nov. 26, 2008 (mailing date), Dumitras, et al.

Notice of Allowance of U.S. Appl. No. 10/640,944, Jan. 10, 2008 (mailing date), Dumitras, et al.

1.312 Amendment of U.S. Appl. No. 10/640,944, Apr. 10, 2008 (mailing date), Dumitras, et al.

Notice of Allowance of U.S. Appl. No. 10/640,944, Jul. 9, 2008 (mailing date), Dumitras, et al.

Non-Final Office Action for U.S. Appl. No. 10/640,734, Dec. 18, 2006 (mailing date), Dumitras, et al.

Final Office Action for U.S. Appl. No. 10/640,734, Jun. 22, 2007 (mailing date), Dumitras, et al.

Non-Final Office Action for U.S. Appl. No. 10/640,734, Sep. 21, 2007 (mailing date), Dumitras, et al.

Notice of Allowance of U.S. Appl. No. 10/640,734, Feb. 29, 2008 (mailing date), Dumitras, et al.

1.312 Amendment of U.S. Appl. No. 10/640,734, May 16, 2008 (mailing date), Dumitras, et al.

Partial International Search Report for PCT/US2004/017415, Nov. 22, 2004 (mailing date), Apple Computer, Inc.

International Search Report and Written Opinion for PCT/US2004/017415, Jan. 28, 2005 (mailing date), Apple Computer, Inc.

International Preliminary Report on Patentability and Written Opinion for PCT/US2004/017415, Feb. 23, 2006 (mailing date), Apple Computer, Inc.

Algazi, V. R., et al. "Preprocessing for Improved Performance in Image and Video Coding," *Proceedings of the Spie*, 1995, pp. 22-31, vol. 2564, SPIE, Bellingham, VA, US.

Dumitras, Adriana and Normile, Jim, "An automatic method for unequal and omni-directional anisotropic diffusion filtering of video sequences," in *Proceedings of IEEE Intl. Conference on Acoustics, Speech and Signal Processing*, May 17-21, 2004, Montreal, Canada.

Euncheol, Choi, et al. "Deblocking Algorithm for DCT-based Compressed Images Using Anisotropic Diffusion," *2003 IEEE International Conference on Acoustics, Speech, and Signal Processing*, Apr. 6, 2003, pp. III717-III720, vol. 1 of 6, IEEE, New York, NY, US.

F. Torkamani-Azar and K.E. Tait, "Image recovery using the anisotropic diffusion equation," IEEE Transactions on Image Processing, vol. 5, No. 11, pp. 1573-1578, Nov. 1996.

Fischl, B., et al. "Adaptive Nonlocal Filtering: A Fast Alternative to Anisotropic Diffusion for Image Enhancement" *IEEE Transactions on Pattern Analysis and Machine Intelligence*, Jan. 1999, pp. 42-48, vol. 21, No. 1, IEEE Inc., New York, US.

H. Ling and A.C. Bovik, "Smoothing low-SNR molecular images via anisotropic median-diffusion," IEEE Transactions on Image Processing, vol. 21, No. 4, pp. 377-384, Apr. 2002.

I.Kopilovic and T. Sziranyi, "Nonlinear scale-selection for image compression improvement obtained by perceptual distortion criteria," in Proc. of the international Conference on Image Analysis and Processing, Venice, Italy, 1999, pp. 197-202.

J. You, H.A. Cohen, W.P. Zhu, and E. Pissaloux, "A robust and real-time texture analysis system using a distributed workstation cluster," in Proceedings of ICASSP'96, Atlanta, GA, USA, 1996, vol. 4, pp. 2207-2210.

Michael J. Black, Guillermo Shapiro, David H. Marimont, and David Heeger, "Robust anisotropic diffusion," IEEE Transactions on Image Processing, vol. 7, No. 3, pp. 421-432, Mar. 1998.

Pietro Perona, "Anisotropic diffusion processes in early vision," in Proc. of the IEEE Multidimensional Signal Processing Workshop, Pacific Grove, CA, USA, 1989.

Scott T. Acton, "Multigrid anisotropic diffusion," IEEE Transactions on Image Processing, vol. 7, No. 3, pp. 280-291, Mar. 1998.

T. Sziranyi, I. Kopilovic, and B.P. Toth, "Anisotropic diffusion as a preprocessing step for efficient compression," in Proc. of the International Conference on Pattern Recognition, Brisbane, Australia, 1998, vol. 2, pp. 1565-1567.

Tsuji H., et al., "A nonlinear spatio-temporal diffusion and its application to prefiltering in MPEG-4video coding" *Proceedings 2002 International Conference on Image Processing*, Sep. 22, 2002, pp. 85-88, vol. 2 of 3, IEEE, New York, NY, US.

Portions of prosecution history of U.S. Appl. No. 10/640,734, Dec. 20, 2007, Dumitras, Adriana, et al.

Portions of prosecution history of U.S. Appl. No. 10/640,944, Apr. 23, 2007, Dumitras, Adriana, et al.

* cited by examiner

PRE-PROCESSING METHOD AND SYSTEM FOR DATA REDUCTION OF VIDEO SEQUENCES AND BIT RATE REDUCTION OF COMPRESSED VIDEO SEQUENCES USING SPATIAL FILTERING

CLAIM OF BENEFIT TO PRIOR APPLICATION

The present application is a continuation application of U.S. patent application Ser. No. 10/640,944, filed Aug. 13, 2003, now issued U.S. Pat. No. 7,430,335. U.S. patent application Ser. No. 10/640,944 is now published as United States Patent Publication 2005/0036704 on Feb. 17, 2005. The above application and publication are incorporated herein by reference.

FIELD OF THE INVENTION

The invention addresses pre-processing by spatial filtering for data reduction of video sequences and bit rate reduction of compressed video sequences.

BACKGROUND OF THE INVENTION

Video is currently being transitioned from an analog medium to a digital medium. For example, the old analog NTSC television broadcasting standard is slowly being replaced by the digital ATSC television broadcasting standard. Similarly, analog video cassette tapes are increasingly being replaced by digital versatile discs (DVDs). Thus, it is important to identify efficient methods of digitally encoding video information. An ideal digital video encoding system will provide a very high picture quality with the minimum number of bits.

The pre-processing of video sequences can be an important part of digital video encoding systems. A good video pre-processing system can achieve a bit rate reduction in the final compressed digital video streams. Furthermore, the visual quality of the decoded sequences is often higher when a good pre-processing system has been applied as compared to that obtained without pre-processing. Thus, it would be beneficial to design video pre-processing systems that will alter a video sequence in a manner that will improve the compression of the video sequence by a digital video encoder.

SUMMARY OF THE INVENTION

Embodiments of the present invention provide methods for pre-processing of video sequences prior to compression to provide data reduction of the video sequence. In addition, after compression of the pre-processed video sequence, the bit rate of the pre-processed and compressed video sequence will be lower than the bit rate of the video sequence after compression but without pre-processing.

Some embodiments of the present invention provide a spatial method for pre-processing video frames of a video sequence using spatial anisotropic diffusion filtering. Some embodiments use conventional spatial anisotropic diffusion filters such as a Perona-Malik anisotropic diffusion filter or a Fallah-Ford diffusion filter which are not traditionally applied for bit rate reduction. Other embodiments use an omni-directional spatial filtering method that extends the traditional Perona-Malik diffusion filter (that normally performs diffusion only in horizontal or vertical directions) so that diffusion is also performed in at least one diagonal direction. In some embodiments, the omni-directional filtering method provides diffusion filtering in eight directions (north, south, east, west, north-east, south-east, south-west, and north-west). By extending the spatial filter to perform omni-directional diffusion, the effectiveness of the pre-filtering stage is significantly improved such that less smoothing and/or blurring of edges is produced in the final decoded frames.

The present invention also includes a foreground/background differentiation pre-processing method that performs filtering differently on a foreground region of a video frame in a video sequence than on a background region of the video frame. The method includes identifying pixel locations in the video frame having pixel values that match characteristics of human skin. A bounding shape is then determined for each contiguous grouping of matching pixel locations (i.e., regions-of-interest), the bounding shape enclosing all or a portion of the contiguous grouping of matching pixel locations. The totality of all pixel locations of the video frame contained in a bounding shape is referred to as a foreground region. Any pixel locations in the video frame not contained within the foreground region comprises a background region. The method then filters pixel locations in the foreground region differently than pixel locations in the background region.

Performing different types of filtering on different regions of the video frame allows greater data reduction in unimportant regions of the video frame while preserving sharp edges in regions-of-interest. The present invention provides automatic detection of regions-of-interest (e.g., a person's face) and implements bounding shapes instead of exact segmentation of a region-of-interest. This allows for a simple and fast filtering method that is viable in real-time applications (such as videoconferencing) and bit rate reduction of the compressed video sequence.

Different embodiments of the present invention may be used independently to pre-process a video sequence or may be used in any combination with any other embodiment of the present invention and in any sequence. As such, the spatial filtering methods of the present invention may be used independently or in conjunction with temporal filtering methods and/or the foreground/background differentiation methods of the present invention to pre-process a video sequence. Furthermore, the foreground/background differentiation methods of the present invention may be used independently or in conjunction with the temporal filtering methods and/or the spatial filtering methods of the present invention to pre-process a video sequence. In addition, the temporal filtering method of the present invention may be used independently or in conjunction with the spatial filtering methods and/or the foreground/background differentiation methods of the present invention to pre-process a video sequence.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
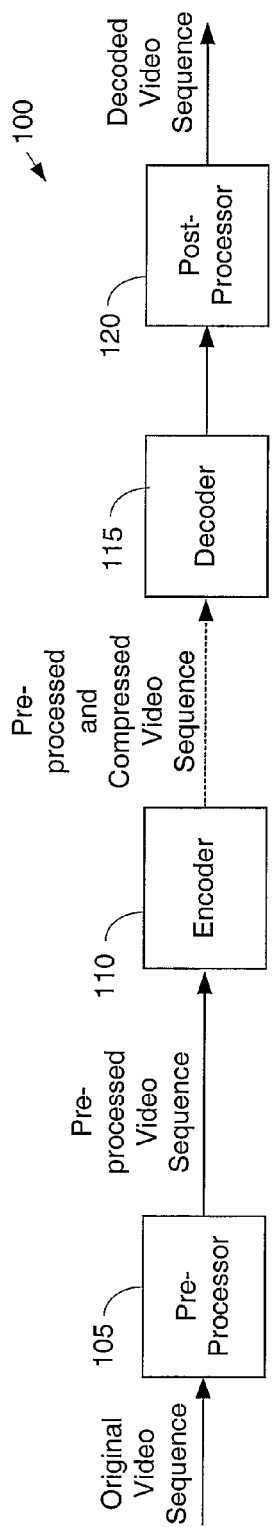
FIG. 1 illustrates a coding system with pre-processing and post-processing components.

The disclosure of U.S. patent application Ser. No. 10/640,734 entitled "Pre-processing Method and System for Data Reduction of Video Sequences and Bit Rate Reduction of Compressed Video Sequences Using Temporal Filtering," now issued U.S. Pat. No. 7,403,568, is expressly incorporated herein by reference.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Video Pre-Processing

As set forth in the background, a good video pre-processing system can achieve a bit rate reduction in the final compressed digital video streams. Furthermore, a good video pre-processing system may also improve the visual quality of the decoded sequences. Typically, a video pre-processing system may employ filtering, down-sampling, brightness/contrast correction, and/or other image processing techniques. The pre-processing step of filtering is referred to as pre-filtering. Pre-filtering can be accomplished using temporal, spatial, or spatial-temporal filters, all of which achieve partial noise reduction and/or frame rate reduction.

Temporal filtering is a pre-processing step used for smoothing motion fields, frame rate reduction, and tracking and noise reduction between sequential frames of a video sequence. Temporal filtering operations in one dimension (i.e., time dimension) are applied to two or more frames to make use of the temporal redundancy in a video sequence. The main difficulty in designing and applying temporal filters stems from temporal effects, such as motion jaggedness, ghosting, etc., that are sometimes caused by temporal pre-filtering. Such artifacts are particularly visible and difficult to tolerate by the viewers. These artifacts are partly due to the fact that conventional temporal filters are not adaptive to the content or illumination levels of frames in a video sequence.

Spatial filtering is a pre-processing step used for anti-aliasing and smoothing (by removing details of a video frame that are unimportant for the perceived visual quality) and segmentation. Spatial filter design aims at achieving a tradeoff between noise/detail reduction within the frame and the amount of blurring/smoothing that is being introduced.

For video coding applications, a balance between the bit rate reduction as a result of pre-filtering and the subjective quality of the filtered sequences is difficult to achieve. For reasonable bit rate reductions, noticeable distortion is often introduced in the filtered video sequences (and consequently in the decoded sequences that have been pre-filtered before encoding). The distortions may take the form of excessive smoothing of flat areas, blurring of edges (for spatial filters), ghosting, and/or other temporal effects (for temporal filters). Such artifacts are particularly disturbing when they affect regions-of-interest (ROIs) such as a person's face in video-conferencing applications. Even more importantly, even if both the bit rate reduction of the compressed stream and the picture quality of the filtered video sequence prior to encoding are acceptable, there is no guarantee that the subjective quality of the decoded sequence is better than that of the decoded sequence without pre-filtering. Finally, to be viable in real-time applications such as videoconferencing, the filtering methods need to be simple and fast while addressing the limitations mentioned above.

Video Pre-Processing in the Present Invention

Embodiments of the present invention provide methods for pre-processing of video sequences prior to compression to provide data reduction of the video sequence. In addition, after compression of the pre-processed video sequence, the bit rate of the pre-processed and compressed video sequence may be lower than the bit rate of the video sequence after compression but without pre-processing.

Some embodiments of the present invention provide a temporal filtering method for pre-processing of video frames of a video sequence. In the temporal filtering method, pixel values (such as luminance and chrominance values) of successive frames are filtered when the difference in the pixel values between the successive frames are within a specified range as defined by high and low threshold values. The high and low threshold values are determined adaptively depending on the illumination level of a video frame to provide variability of filtering strength depending on the illumination levels of a video frame. As a result, the method provides for data reduction of the video sequence and bit rate reduction of the compressed video sequence.

Some embodiments of the present invention provide a spatial filtering method for pre-processing a video sequence using spatial anisotropic diffusion filtering. Some embodiments use conventional spatial anisotropic diffusion filters such as a Perona-Malik anisotropic diffusion filter or a Fallah-Ford diffusion filter. Other embodiments use an omni-directional spatial filtering method that extends the traditional Perona-Malik diffusion filter (that performs diffusion in four horizontal or vertical directions) so that diffusion is also performed in at least one diagonal direction. In some embodiments, the omni-directional filtering method provides diffusion filtering in eight directions (north, south, east, west, north-east, south-east, south-west, and north-west).

The present invention also includes a foreground/background differentiation pre-processing method that performs filtering differently on a foreground region of a video frame in a video sequence than on a background region of the video frame. The method includes identifying pixel locations in the video frame having pixel values that match characteristics of human skin. In other embodiments, the method includes identifying pixel locations in the video frame having pixel values that match other characteristics, such as a predetermined color or brightness. A bounding shape is then determined for each contiguous grouping of matching pixel locations (i.e., regions-of-interest), the bounding shape enclosing all or a portion of the contiguous grouping of matching pixel locations. The totality of all pixel locations of the video frame contained in a bounding shape is referred to as a foreground region. Any pixel locations in the video frame not contained within the foreground region comprises a background region. The method then filters pixel locations in the foreground region differently than pixel locations in the background region. The method provides automatic detection of regions-of-interest (e.g., a person's face) and implements bounding shapes instead of exact segmentation of a region-of-interest. This allows for a simple and fast filtering method that is viable in real-time applications (such as videoconferencing) and bit rate reduction of the compressed video sequence.

Different embodiments of the present invention may be used independently to pre-process a video sequence or may be used in any combination with any other embodiment of the present invention and in any sequence. As such, the temporal filtering method of the present invention may be used independently or in conjunction with the spatial filtering methods and/or the foreground/background differentiation methods of the present invention to pre-process a video sequence. In addition, the spatial filtering methods of the present invention may be used independently or in conjunction with the temporal filtering methods and/or the foreground/background differentiation methods of the present invention to pre-process a video sequence. Furthermore, the foreground/background differentiation methods of the present invention may be used independently or in conjunction with the temporal filtering methods and/or the spatial filtering methods of the present invention to pre-process a video sequence.

Some embodiments described below relate to video frames in YUV format. One of ordinary skill in the art, however, will realize that these embodiments may also relate to a variety of formats other than YUV. In addition, other video frame formats (such as RGB) can easily be transformed into the YUV format. Furthermore, some embodiments are described with reference to a videoconferencing application. One of ordinary skill in the art, however, will realize that the teachings of the present invention may also relate to other video encoding applications (e.g., DVD, digital storage media, television broadcasting, internet streaming, communication, etc.) in real-time or post-time. Embodiments of the present invention may also be used with video sequences having different coding standards such as H.263 and H.264 (also known as MPEG-4/Part 10).

As stated above, embodiments of the present invention provide methods for pre-processing of video sequences prior to compression to provide data reduction. As used herein, data reduction of a video sequence refers to a reduced amount of details and/or noise in a pre-processed video sequence before compression in comparison to the same video sequence before compression but without pre-processing. As such, data reduction of a video sequence refers to a comparison of the details and/or noise in a pre-processed and uncompressed video sequence, and an uncompressed-only video sequence, and does not refer to the reduction in frame size or frame rate.

In addition, embodiments of the present invention provide that after compression of the pre-processed video sequence, the bit rate of the pre-processed and compressed video sequence will be lower than the bit rate of compressed video sequence made without any pre-processing. As used herein, reduction or lowering of the bit rate of a compressed video sequence refers to a reduced or lowered bit rate of a pre-processed video sequence after compression in comparison to the same video sequence after compression but without pre-processing. As such, reduction or lowering of the bit rate of a compressed video sequence refers to a comparison of the bit rates of a pre-processed and compressed video sequence and a compressed-only video sequence and does not refer to the reduction or lowering of the bit rate of a video sequence caused by compression (i.e., encoding).

The various embodiments described below provide a method for pre-processing/pre-filtering of video sequences for data reduction of the video sequences and bit rate reduction of the compressed video sequences. Embodiments relating to temporal pre-filtering are described in Section I. Embodiments relating to spatial pre-filtering are described in Section II. Embodiments relating to filtering foreground and background regions of a video frame differently are described in Section III.

FIG. 1 illustrates a coding system 100 with pre-processing and post-processing components. A typical coding system includes an encoder component 110 preceded by a pre-processing component 105 and a decoder component 115 followed by a post-processing component 120. Pre-filtering of a video sequence is performed by the pre-processing component 105, although in other embodiments, the pre-filtering is performed by the encoding component 110.

As illustrated in FIG. 1, an original video sequence is received by the pre-processing component 105, the original video sequence being comprised of multiple video frames and having an associated original data amount. In some embodiments, the pre-processing component 105 pre-filters the original video sequence to remove noise and details and produces a pre-processed (i.e., pre-filtered) video sequence having an associated pre-processed data amount that is less than the original data amount associated with the original video sequence. The data amount of a video sequence reflects an amount of data used to represent the video sequence.

The encoding component 110 then receives the pre-processed video sequence and encodes (i.e., compresses) the pre-processed video sequence to produce a pre-processed and compressed video sequence. Pre-filtering methods performed by the pre-processing component 105 allows removal of noise and details from the original video sequence thus allowing for greater compression of the pre-processed video sequence by the encoding component 110. As such, the bit rate of the pre-processed and compressed video sequence is lower than the bit rate that would be obtained by compressing the original video sequence (without pre-preprocessing) with an identical compression method using the encoding component 110. The bit rate of a video sequence reflects an amount of binary coded data required to represent the video sequence over a given period of time and is typically measured in kilobits per second.

The compressed video sequence is received by the decoder component 115 which processes the compressed video sequence to produce a decoded video sequence. In some systems, the decoded video sequence may be further post-processed by the post processing component 120.

Figure 2:
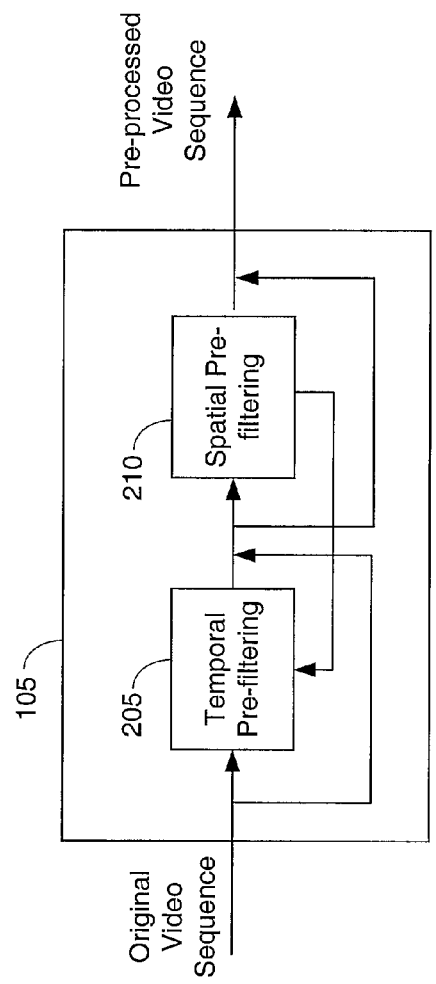
FIG. 2 illustrates a pre-processing component with separate temporal pre-filtering and spatial pre-filtering components.

FIG. 2 illustrates a block diagram of video pre-processing component 105 with separate temporal pre-filtering and spatial pre-filtering components 205 and 210, respectively. The video pre-processing component 105 receives an original video sequence comprised of multiple video frames and produces a pre-processed video sequence. In some embodiments, the temporal pre-filtering component 205 performs pre-processing operations on the received video sequence and sends the video sequence to the spatial pre-filtering component 210 for further pre-processing. In other embodiments, the spatial pre-filtering component 210 performs pre-processing operations on the received video sequence and sends the video sequence to the temporal pre-filtering component 205 for further pre-processing. In further embodiments, pre-processing is performed only by the temporal pre-filtering component 205 or only by the spatial pre-filtering component 210. In some embodiments, the temporal pre-filtering component 205 and the spatial pre-filtering component 210 are configured to perform particular functions through instructions of a computer program product having a computer readable medium.

Data reduction of the video frames of the original video sequence is achieved by the temporal pre-filtering component 205 and/or the spatial pre-filtering component 210. The temporal pre-filtering component 205 performs temporal pre-filtering methods of the present invention (as described in Section I) while the spatial pre-filtering component 210 performs spatial pre-filtering methods of the present invention (as described in Sections II and III). In particular, the spatial pre-filtering component 210 may use spatial anisotropic diffusion filtering for data reduction in a video sequence.

Section I: Temporal Pre-Filtering

Figure 3:
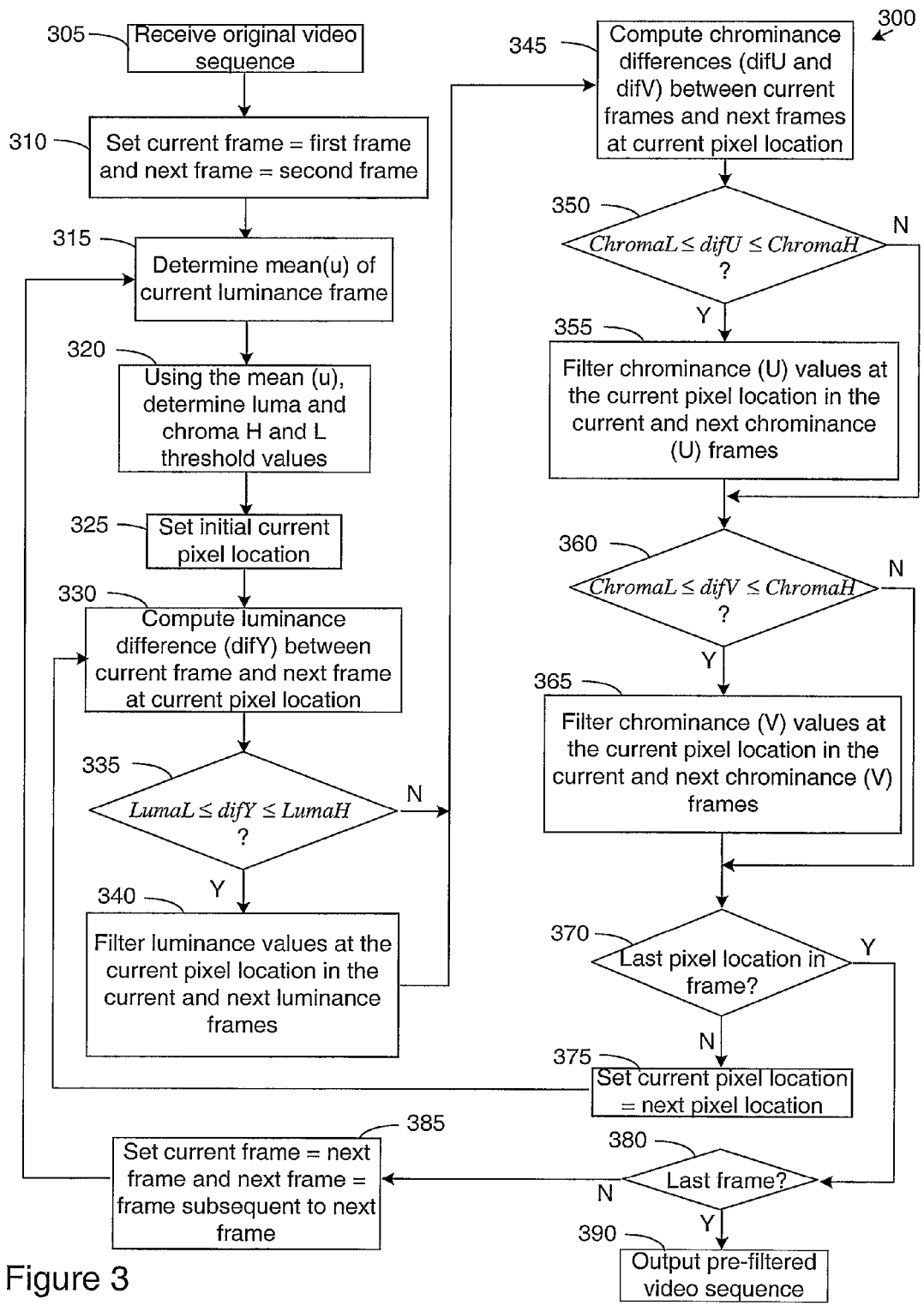
FIG. 3 illustrates a flowchart for a temporal pre-filtering method in accordance with the present invention.

FIG. 3 illustrates a flowchart for a temporal pre-filtering method 300 in accordance with the present invention. The method 300 may be performed, for example, by the temporal pre-filtering component 205 or the encoder component 110. The temporal pre-filtering method 300 commences by receiving an original video sequence in YUV format (at 305). The original video sequence comprises a plurality of video frames and having an associated data amount. In other embodiments, a video sequence in another format is received. The method then sets (at 310) a first video frame in the video sequence as a current frame (i.e., frame f) and a second video frame in the video sequence as a next frame (i.e., frame f+1).

The current frame is comprised of a current luminance (Y) frame and current chrominance (U and V) frames. Similarly, the next frame is comprised of a next luminance (Y) frame and next chrominance (U and V) frames. As such, the current and next frames are each comprised of a plurality of pixels at pixel locations where each pixel location contains one or more pixel values (such as luminance and chrominance values from the luminance and chrominance frames, respectively). Pixels and pixel locations are identified by discrete row (e.g., i) and column (e.g., j) indices (i.e., coordinates) such that $1 \leq i \leq M$ and $1 \leq j \leq N$ where M×N is the size of the current and next frame in pixel units.

The method then determines (at 315) the mean of the luminance values in the current luminance frame. Using the mean luminance (abbreviated as mean (Y) or mu), the method determines (at 320) high and low luminance threshold values ($\theta_{luma}^{H}$ and $\theta_{luma}^{L}$, respectively) and high and low chrominance threshold values ($\theta_{chroma}^{H}$ and $\theta_{chroma}^{L}$, respectively), as discussed below with reference to FIGS. 4a and 4b.

The method then sets (at 325) row (i) and column (j) values for initial current pixel location coordinates. For example, the initial current pixel location coordinates may be set to equal (0, 0). The method 300 then computes (at 330) a difference between a luminance value at the current pixel location coordinates in the next luminance frame and a luminance value at the current pixel location coordinates in the current luminance frame. This luminance difference ($difY_{i,j}$) can be expressed mathematically as:

$$difY_{i,j} = x_{i,j}(Y_{f+1}) - x_{i,j}(Y_f)$$

where i and j are coordinates for the rows and columns, respectively, and f indicates the current frame and f+1 indicates the next frame.

The method 300 then determines (at 335) if the luminance difference ($difY_{i,j}$) at the current pixel location coordinates is within the high and low luminance threshold values $\theta_{luma}^{H}$ and $\theta_{luma}^{L}$, respectively). If not, the method proceeds directly to step 345. If, however, the method determines (at 335—Yes) that the luminance difference ($difY_{i,j}$) is within the high and low luminance threshold values, the luminance values at the current pixel location coordinates in the current and next luminance frames are filtered (at 340). In some embodiments, the luminance value at the current pixel location coordinates in the next luminance frame is set to equal the average of the luminance values at the current pixel location coordinates in the current luminance frame and the next luminance frame. This operation can be expressed mathematically as:

$$x_{i,j}(Y_{f+1}) = (x_{i,j}(Y_f) + x_{i,j}(Y_{f+1}))/2.$$

In other embodiments, other filtering methods are used.

The method 300 then computes (at 345) differences in chrominance values of the next chrominance (U and V) frames and current chrominance (U and V) frames at the current pixel location coordinates. These chrominance differences ($difU_{i,j}$ and $difV_{i,j}$) can be expressed mathematically as:

$$difU_{i,j} = x_{i,j}(U_{f+1}) - x_{i,j}(U_f) \text{ and}$$

$$difV_{i,j} = x_{i,j}(V_{f+1}) - x_{i,j}(V_f).$$

The method 300 then determines (at 350) if the U chrominance difference ($difU_{i,j}$) at the current pixel location coordinates is within the high and low U chrominance threshold values ($\theta_{chroma}^{H}$ and $\theta_{chroma}^{L}$, respectively). If not, the method proceeds directly to step 360. If, however, the method determines (at 350—Yes) that the U chrominance difference ($difU_{i,j}$) is within the high and low U chrominance threshold values, then the U chrominance values at the current pixel location coordinates in the current and next U chrominance frames are filtered (at 355). In some embodiments, the value at the current pixel location coordinates in the next U chrominance frame is set (at 355) to equal the average of the values at the current pixel location coordinates in the current U chrominance frame and the next U chrominance frame. This operation can be expressed mathematically as:

$$x_{i,j}(U_{f+1}) = (x_{i,j}(U_f) + x_{i,j}(U_{f+1}))/2.$$

In other embodiments, other filtering methods are used.

The method 300 then determines (at 360) if the V chrominance difference ($difV_{i,j}$) at the current pixel location coordinates is within the high and low V chrominance threshold values ($\theta_{chroma}^{H}$ and $\theta_{chroma}^{L}$, respectively). If not, the method proceeds directly to step 370. If, however, the method determines (at 360—Yes) that the V chrominance difference ($difV_{i,j}$) is within the high and low V chrominance threshold values, then the V chrominance values at the current pixel location coordinates in the current and next V chrominance frames are filtered (at 365). In some embodiments, the value at the current pixel location coordinates in the next V chrominance frame is set to equal the average of the values at the current pixel location coordinates in the current V chrominance frame and the next V chrominance frame. This operation can be expressed mathematically as:

$$x_{i,j}(V_{f+1})=(x_{i,j}(V_f)+x_{i,j}(V_{f+1}))/2.$$

In other embodiments, other filtering methods are used.

The method 300 then determines (at 370) if the current pixel location coordinates are last pixel location coordinates of the current frame. For example, the method may determine whether the current row (i) coordinate is equal to M and the current column (j) coordinate is equal to N where M×N is the size of the current frame in pixel units. If not, the method sets (at 375) next pixel location coordinates in the current frame as the current pixel location coordinates. The method then continues at step 330.

If the method 300 determines (at 370—Yes) that the current pixel location coordinates are the last pixel location coordinates of the current frame, the method 300 then determines (at 380) if the next frame is a last frame of the video sequence (received at 305). If not, the method sets (at 385) the next frame as the current frame (i.e., frame f) and a frame in the video sequence subsequent to the next frame as the next frame (i.e., frame f+1). For example, if the current frame is a first frame and the next frame is a second frame of the video sequence, the second frame is set (at 385) as the current frame and a third frame of the video sequence is set as the next frame. The method then continues at step 315.

If the method 300 determines (at 380—Yes) that the next frame is the last frame of the video sequence, the method outputs (at 390) a pre-filtered video sequence being comprised of multiple pre-filtered video frames and having an associated data amount that is less than the data amount associated with the original video sequence (received at 305). The pre-filtered video sequence may be received, for example, by the spatial pre-filtering component 210 for further pre-processing or the encoder component 110 for encoding (i.e., compression). After compression by the encoder component 110, the bit rate of the pre-filtered and compressed video sequence is lower than the bit rate that would be obtained by compressing the original video sequence (without pre-filtering) using the same compression method.

Figure 4A:
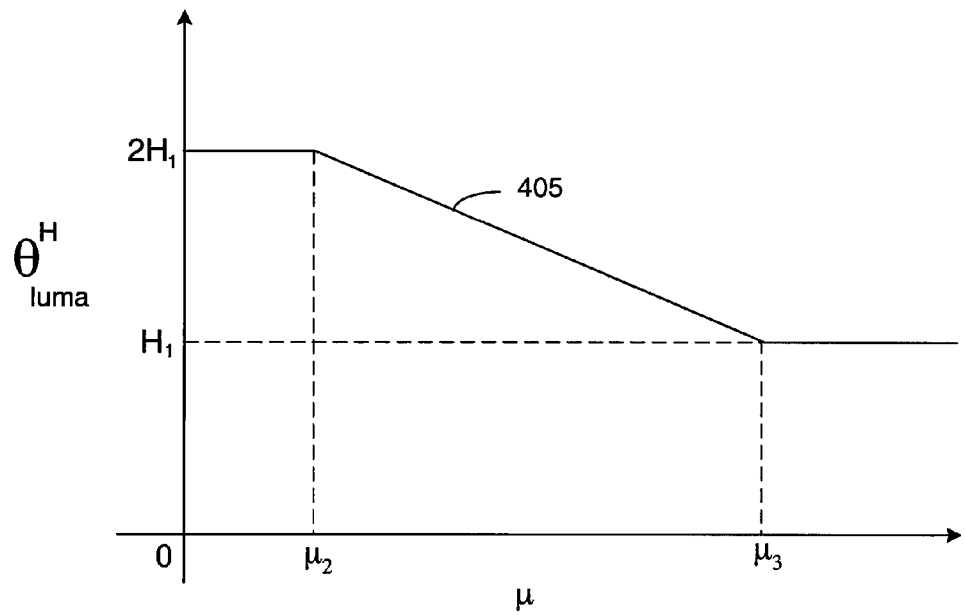
FIG. 4a illustrates a graph of an exemplary high luminance threshold function that determines a high luminance threshold value.

FIG. 4a illustrates a graph of an exemplary high luminance threshold function 405 that determines a high luminance threshold value ($\theta_{luma}^{H}$). In the example shown in FIG. 4a, the high luminance threshold function 405 is a piecewise linear function of the mean luminance (mean (Y)) of a video frame, the mean luminance being equal to mu, as expressed by the following equations:

$$\theta_{luma}^{H} = \begin{cases} 2H_1, & \text{if } \mu \leq \mu_2 \\ -a\mu + b, & \text{if } \mu_2 < \mu < \mu_3 \\ H_1, & \text{if } \mu \geq \mu_3 \end{cases}$$

Figure 4B:
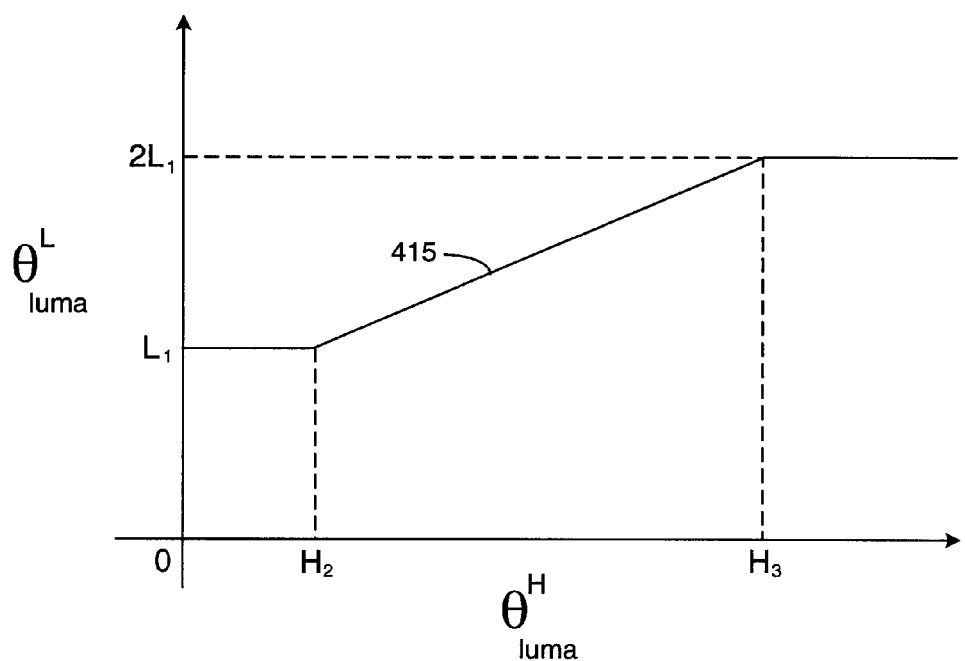
FIG. 4b illustrates a graph of an exemplary low luminance threshold function that determines a low luminance threshold value.

FIG. 4b illustrates a graph of an exemplary low luminance threshold function 415 that determines a low luminance threshold value ($\theta_{luma}^{L}$) In the example shown in FIG. 4b, the low luminance threshold function 415 is a piecewise linear function of the high luminance threshold value as expressed by the following equations:

$$\theta_{luma}^{L} = \begin{cases} L_1, & \text{if } \theta_{luma}^{H} \leq H_2 \\ c\theta_{H}^{luma} + d, & \text{if } H_2 < \theta_{luma}^{H} < H_3 \\ 2L_1, & \text{if } \theta_{luma}^{H} \geq H_3 \end{cases}.$$

In FIGS. 4a and 4b, $H_1$, $L_1$, $u_2$, $u_3$, $H_2$, and $H_3$ are predetermined values. The value of $H_1$ determines the saturation level of the high luminance threshold function 405 and the value of $L_1$ determines the saturation level of the low luminance threshold function 415. The values $u_2$ and $u_3$ determine cutoff points for the linear variation of the high luminance threshold function 405 and the values $H_2$, and $H_3$ determine cutoff points for the linear variation of the low luminance threshold function 415. Correct specification of values $u_2$, $u_3$, $H_2$, and $H_3$ are required to prevent temporal artifacts such as ghosting or trailing to appear in a temporal-filtered video sequence.

In some embodiments, the high chrominance threshold value ($\theta_{chroma}^{H}$) is based on the high luminance threshold value ($\theta_{luma}^{H}$) and the low chrominance threshold value ($\theta_{chrome}^{L}$) is based on the low luminance threshold value ($\theta_{luma}^{L}$). For example, in some embodiments, the values for the high and low chrominance threshold values ($\theta_{chroma}^{H}$ and $\theta_{chroma}^{L}$, respectively) can be determined by the following equations:

$$\theta_{chroma}^{H}=1.6\theta_{luma}^{H}$$

$$\theta_{chroma}^{L}=2\theta_{luma}^{L}$$

As described above, the high luminance threshold ($\theta_{luma}^{H}$) is a function of the mean luminance of a video frame, the low luminance threshold ($\theta_{luma}^{L}$) is a function of the high luminance threshold ($\theta_{luma}^{H}$), the high chrominance threshold ($\theta_{chrome}^{H}$) is based on the high luminance threshold ($\theta_{luma}^{H}$), and the low chrominance threshold ($\theta_{chrome}^{L}$) is based on the low luminance threshold ($\theta_{luma}^{L}$). As such, the high and low luminance and chrominance threshold values are based on the mean luminance of a video frame and thus provide variability of filtering strength depending on the illumination levels of the frame to provide noise and data reduction.

Section II: Spatial Pre-Filtering

Some embodiments of the present invention provide a method for pre-processing a video sequence using spatial anisotropic diffusion filtering to provide data reduction of the video sequence. In addition, after compression of the pre-processed video sequence, the bit rate of the pre-processed and compressed video sequence will be lower than the bit rate of the video sequence after compression but without pre-processing.

Some embodiments use conventional spatial anisotropic diffusion filters such as a Fallah-Ford diffusion filter (as described with reference to FIG. 5) or a Perona-Malik anisotropic diffusion filter (as described with reference to FIG. 6). Other embodiments use an omni-directional spatial filtering method that extends the traditional Perona-Malik diffusion filter to perform diffusion in at least one diagonal direction (as described with reference to FIG. 8 and FIG. 9).

Fallah-Ford Spatial Filtering

In some embodiments, the mean curvature diffusion (MCD) Fallah-Ford spatial anisotropic diffusion filter is used. The MCD Fallah-Ford filter makes use of a surface diffusion model as opposed to a plane diffusion model employed by the Perona-Malik anisotropic diffusion filter discussed below. In the MCD model, an image is a function of two spatial location coordinates (x, y) and a third (gray level) z coordinate. For each pixel located at the pixel location coordinates (x, y) in the image I, the MCD diffusion is modeled by the MCD diffusion equation:

$$\frac{\partial h(x, y, z, t)}{\partial t} = div(c\nabla h)$$

where the function h is given by the equation:

$$h(x,y,z,t)=z-I(x,y,t)$$

and the diffusion coefficient c(x, y, t) is computed as the inverse of the surface gradient magnitude, i.e.:

$$c(x, y, t) = \frac{1}{\|\nabla h\|} = \frac{1}{\sqrt{\|\nabla I\|^2 + 1}}$$

It can be shown that the MCD theory holds if the image is linearly scaled and the implicit surface function is redefined as:

$$h(x,y,x)=z-mI(x,y,t)-n$$

where m and n are real constants. The diffusion coefficient of MCD becomes $$c(x, y, t) = \frac{1}{\|\nabla h\|} = \frac{1}{\sqrt{m^2\|\nabla I\|^2 + 1}}.$$

The edges satisfying the condition $\|\nabla I\|\gg 1/m$ are preserved. The smaller the value of m, the greater the diffusion in each iteration and the faster the surface evolves. From iteration t to t+1, the total absolute change in the image surface area is given by the equation:

$$\Delta A(t+1)=\iint\|\nabla h(x,y,t+1)|-|\nabla h(x,y,t)\|dxdy$$

Note that if the mean curvature is defined as the average value of the normal curvature in any two orthogonal directions, then selecting the diffusion coefficient to be equal to the inverse of the surface gradient magnitude results in the diffusion of the surface at a rate equal to twice the mean curvature, and hence the name of the algorithm.

Figure 5:
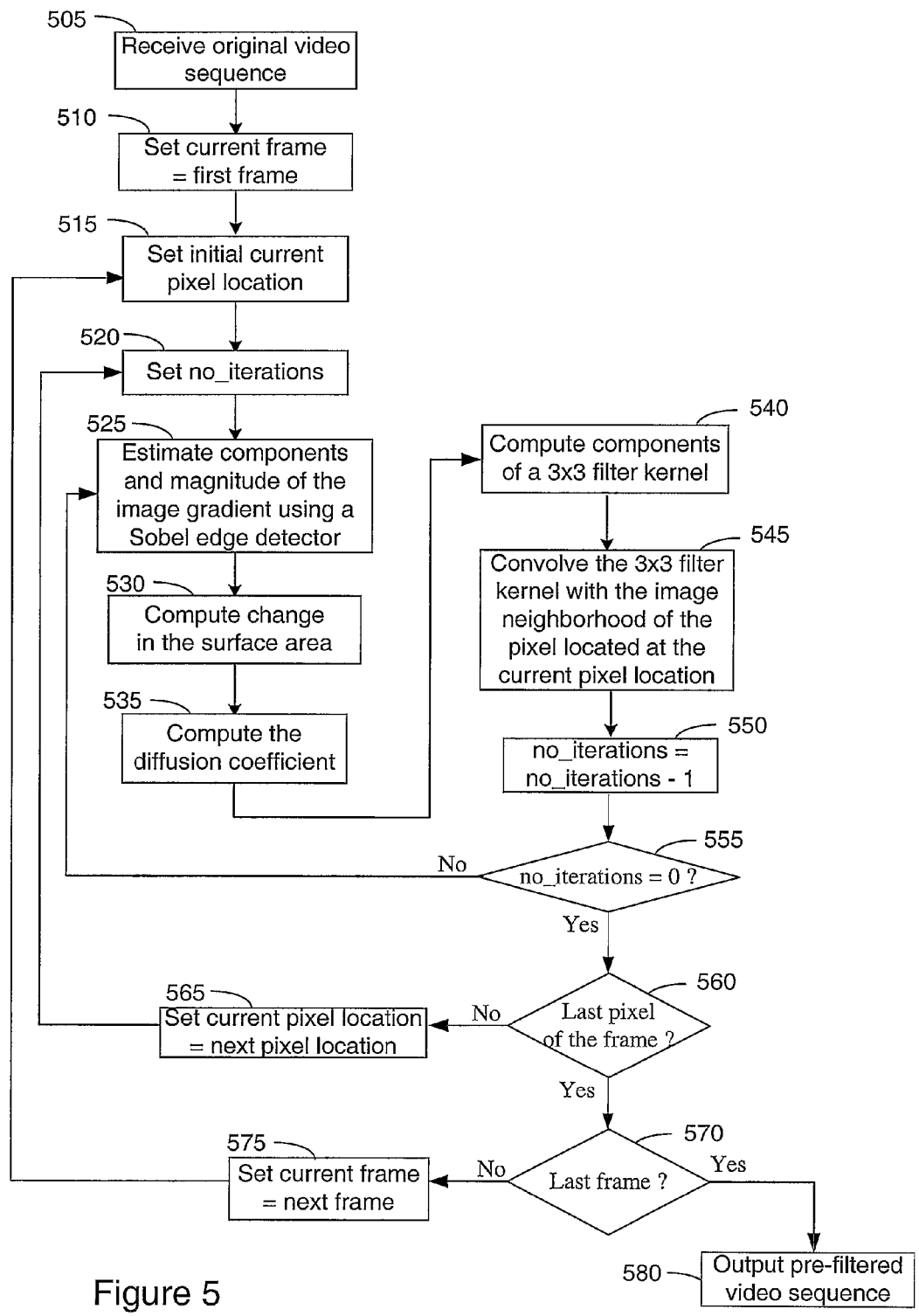
FIG. 5 illustrates a flowchart depicting a method for pre-processing a video sequence using Fallah-Ford spatial anisotropic diffusion filtering for data reduction.

FIG. 5 is a flowchart showing a method 500 for pre-processing a video sequence using Fallah-Ford spatial anisotropic diffusion filtering to reduce the data amount of the video sequence and to reduce the bit rate of the compressed video sequence. The method 500 may be performed, for example, by the spatial pre-filtering component 210 or the encoder component 110.

The method 500 starts when an original video sequence comprised of multiple video frames is received (at 505), the original video sequence having an associated data amount. The method sets (at 510) a first video frame in the video sequence as a current frame. The current frame is comprised of a plurality of pixels at pixel locations where each pixel location contains one or more pixel values (such as luminance and chrominance values). In some embodiments, the Y luminance values (gray level values) of the current frame are filtered. In other embodiments, the U chrominance values or the V chrominance values of the current frame are filtered. Pixels and pixel locations are identified by discrete row (e.g., x) and column (e.g., y) coordinates such that $1\leq x\leq M$ and $1\leq y\leq N$ where M×N is the size of the current frame in pixel units. The method then sets (at 515) row (x) and column (y) values for an initial current pixel location. The method also sets (at 520) the number of iterations (no_iterations), i.e., time steps (t), to be performed for each pixel location (x, y). The number of iterations can be determined depending on the amount of details to be removed.

The method then estimates (at 525) components and a magnitude of the image gradient $\|\nabla I\|$ using an edge detector. In one embodiment, the Sobel edge detector is used since the Sobel edge detector makes use of a difference of averages operator and has a good response to diagonal edges. However, other edge detectors may be used. The method then computes (at 530) a change in surface area ΔA using the following equation:

$$\Delta A(t+1)=\iint\|\nabla h(x,y,t+1)|-|\nabla h(x,y,t)\|dxdy$$

The method computes (at 535) diffusion coefficient c(x, y, t) as the inverse of the surface gradient magnitude using the equation:

$$c(x, y, t) = \frac{1}{\|\nabla h\|} = \frac{1}{\sqrt{m^2\|\nabla I\|^2 + 1}}$$

where the scaling parameter m is selected to be equal to the inverse of the percentage change of ΔA. The MCD diffusion equation given by:

$$\frac{\partial h(x, y, z, t)}{\partial t} = div(c\nabla h)$$

can be then approximated in a discrete form using first order spatial differences. The method then computes (at 540) components of a 3×3 filter kernel using the following equations:

$$\begin{bmatrix} w_1 = \frac{1}{8|\nabla h(x-1, y-1)|} & w_2 = \frac{1}{8|\nabla h(x, y-1)|} & w_3 = \frac{1}{8|\nabla h(x+1, y-1)|} \\ w_4 = \frac{1}{8\nabla h(x-1, y)} & w(x, y) = 1 - \sum_{i=1}^{8} w_i & w_5 = \frac{1}{8|\nabla h(x+1, y)|} \\ w_6 = \frac{1}{8|\nabla h(x-1, y+1)|} & w_7 = \frac{1}{8|\nabla h(x, y+1)|} & w_8 = \frac{1}{8|\nabla h(x+1, y+1)|} \end{bmatrix}.$$

The method then convolves (at 545) the 3×3 filter kernel with an image neighborhood of the pixel at the current pixel location (x, y). The method decrements (at 550) no_iterations by one and determines (at 555) if no_iterations is equal to 0. If not, the method continues at step 525. If so, the method determines (at 560) if the current pixel location is a last pixel location of the current frame. If not, the method sets (at 565) a next pixel location in the current frame as the current pixel location. The method then continues at step 520.

If the method 500 determines (at 560—Yes) that the current pixel location is the last pixel location of the current frame, the method then determines (at 570) if the current frame is a last frame of the video sequence (received at 505). If not, the method sets (at 575) a next frame in the video sequence as the current frame. The method then continues at step 515. If the method determines (at 570—Yes) that the current frame is the last frame of the video sequence, the method outputs (at 580) a pre-filtered video sequence being comprised of multiple pre-filtered video frames and having an associated data amount that is less than the data amount associated with the original video sequence (received at 505).

The pre-filtered video sequence may be received, for example, by the temporal pre-filtering component 205 for further pre-processing or the encoder component 110 for encoding (i.e., compression). After compression by the encoder component 110, the bit rate of the pre-filtered and compressed video sequence is lower than the bit rate that would be obtained by compressing the original video sequence (without pre-filtering) using the same compression method.

Traditional Perona-Malik Spatial Filtering

In some embodiments, a traditional Perona-Malik anisotropic diffusion filtering method is used for pre-processing a video frame to reduce the data amount of the video sequence and to reduce the bit rate of the compressed video sequence. Conventional Perona-Malik anisotropic diffusion is expressed in discrete form by the following equation:

$$I(x, y, t+1) = I(x, y, t) + \lambda \sum_{p \in \eta(x,y)} g(\nabla I_p(x, y, t)) \nabla I_p(x, yt)$$

where:

I(x, y, t) is a discrete image;

∇I(x, y, t) is the image gradient;

(x, y) specifies a pixel location in a discrete, two dimensional grid covering the video frame;

t denotes discrete time steps (i.e., iterations);

scalar constant λ determines the rate of diffusion, λ being a positive real number;

η(x, y) represents the spatial neighborhood of the pixel having location (x, y); and g( ) is an edge stopping function that satisfies the condition g(∇I)→0 when ∇I→∞ such that the diffusion operation is stopped across the edges of the video frame.

In two dimensions, the equation becomes:

$$I(x, y, t+1) = \\ I(x, y, t) + \lambda [c_N(x, y, t) \nabla I_N(x, y, t) + c_S(x, y, t) \nabla I_S(x, y, t) + \\ c_E(x, y, t) \nabla I_E(x, y, t) + c_W(x, y, t) \nabla I_W(x, y, t)]$$

where:

subscripts (N, S, E, W) correspond to four horizontal or vertical directions of diffusion (north, south, east, and west) with respect to a pixel location (x, y); and scalar constant λ is less than or equal to $$\frac{1}{|\eta(x, y)|},$$

where |η(x, y)| is the number of neighboring pixels which is equal to four (except at the video frame boundaries where it is less than four) so that $$\lambda \leq \frac{1}{4}.$$

Notations $c_N$, $c_S$, $c_E$, and $c_W$ are diffusion coefficients, each being referred to as an edge stopping function g(x) of ∇I(x, y, t) in a corresponding direction as expressed in the following equations:

$$c_N(x,y,t) = g(\nabla I_N(x,y,t))$$

$$c_S(x,y,t) = g(\nabla I_S(x,y,t))$$

$$c_E(x,y,t) = g(\nabla I_E(x,y,t))$$

$$c_W(x,y,t) = g(\nabla I_W(x,y,t)).$$

The approximation of the image gradient in a selected direction is employed using the equation:

$$\nabla I_p(x,y,t) = I_p(x,y,t) - I(x,y,t), p \in \eta(x,y).$$

For instance, in the "northern" direction the gradient can be computed as the difference given by:

$$\nabla I_N(x,y) = I(x,y+1,t) - I(x,y,t).$$

Various edge-stopping functions g(x) may be used such as:

$$g(x, y, t) = \exp\left[-\left(\frac{\nabla I(x, y, t)}{k}\right)^2\right]$$

and $$g(x, y, t) = \frac{1}{1 + \left(\frac{\nabla I(x, y, t)}{K}\right)^2}$$

where:
notations k and K denote parameters with constant values during the diffusion process; and
$\epsilon > 0$ and $0 \leq p \leq 1$.

Figure 6:
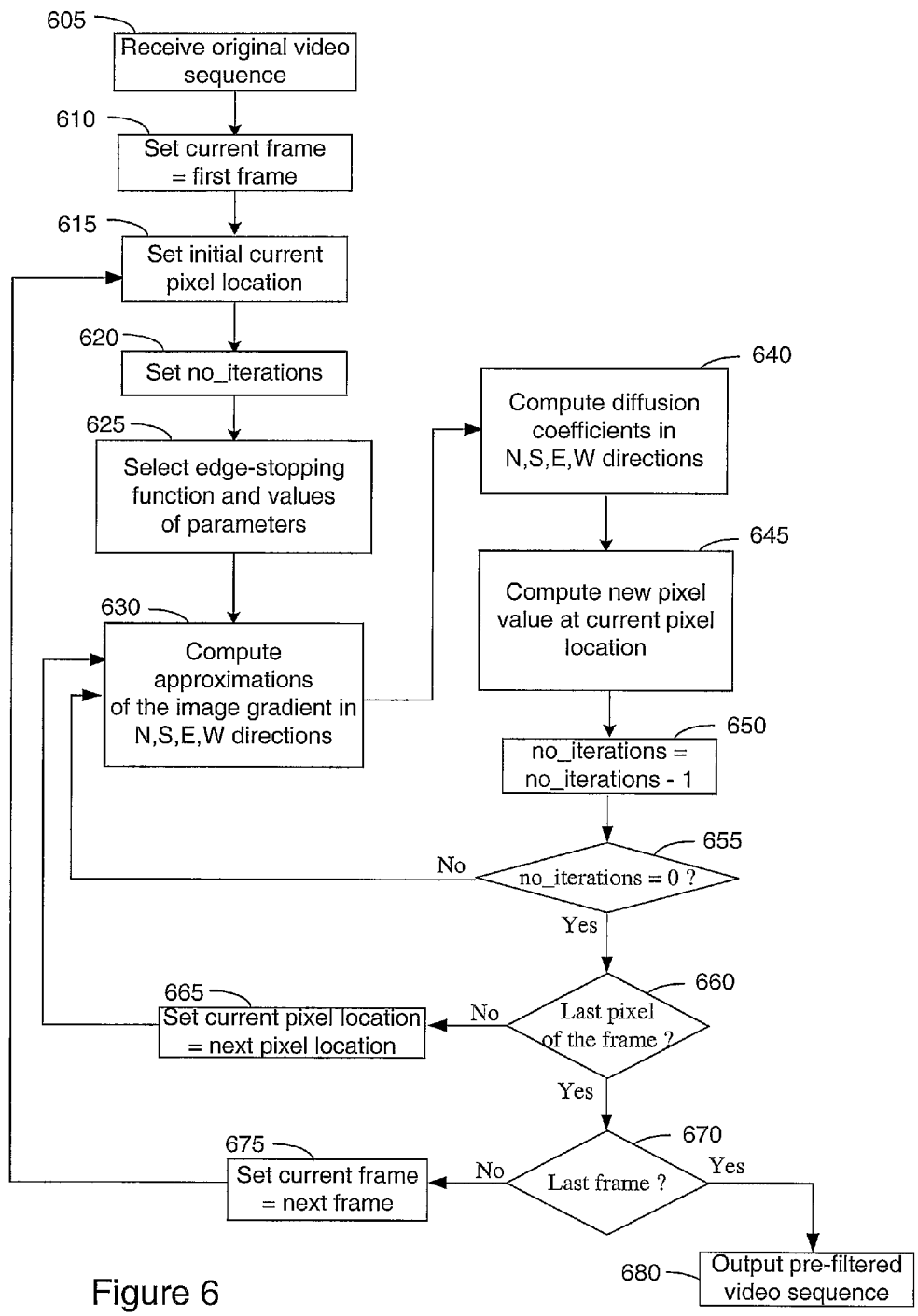
FIG. 6 illustrates a flowchart depicting a method for pre-processing a video sequence using Perona-Malik spatial anisotropic diffusion filtering for data reduction.

FIG. 6 is a flowchart showing a method 600 for pre-processing a video sequence using Perona-Malik spatial anisotropic diffusion filtering to reduce the data amount of the video sequence and to reduce the bit rate of the compressed video sequence. The method 600 may be performed, for example, by the spatial pre-filtering component 210 or the encoder component 110.

The method 600 starts when an original video sequence comprised of multiple video frames is received (at 605), the original video sequence having an associated data amount. The method sets (at 610) a first video frame in the video sequence as a current frame. The current frame is comprised of a plurality of pixels at pixel locations where each pixel location contains one or more pixel values (such as luminance and chrominance values). In some embodiments, the luminance values (i.e., the luminance plane) of the current frame are filtered. In other embodiments, the chrominance (U) values (i.e., the chrominance (U) plane) or the chrominance (V) values (i.e., the chrominance (V) plane) of the current frame are filtered. Pixels and pixel locations are identified by discrete row (e.g., x) and column (e.g., y) coordinates such that $1 \leq x \leq M$ and $1 \leq y \leq N$ where M×N is the size of the current frame in pixel units. The method then sets (at 615) row (x) and column (y) values for an initial current pixel location. The method also sets (at 620) the number of iterations (no_iterations), i.e., time steps (t), to be performed for each pixel location (x,y). The number of iterations can be determined depending on the amount of details to be removed.

The method then selects (at 625) an edge-stopping function g(x) and values of parameters (such as $\lambda$ and k). The method then computes (at 630) approximations of the image gradient in the north, south, east, and west directions ($\delta_N$, $\delta_S$, $\delta_E$, and $\delta_W$, respectively), using the equations:

$$c_N(x,y,t) = g(\nabla I_N(x,y,t))$$

$$c_S(x,y,t) = g(\nabla I_S(x,y,t))$$

$$c_E(x,y,t) = g(\nabla I_E(x,y,t))$$

$$c_W(x,y,t) = g(\nabla I_W(x,y,t)).$$

The method then computes (at 640) diffusion coefficients in the north, south, east, and west directions ($c_N$, $c_S$, $c_E$, and $c_W$ respectively) where:

$$c_N = g(\delta_N)$$

$$c_S = g(\delta_S)$$

$$c_E = g(\delta_E)$$

$$c_W = g(\delta_W).$$

The method then computes (at 645) a new pixel value for the current pixel location using the equation:

$$I(x, y, t+1) = I(x, y, t) + \lambda[c_N(x, y, t)\nabla I_N(x, y, t) + c_S(x, y, t)\nabla I_S(x, y, t) + c_E(x, y, t)\nabla I_E(x, y, t) + c_W(x, y, t)\nabla I_W(x, y, t)]$$

i.e., $I(x, y) = I(x, y) + \lambda(c_N\delta_N + c_S\delta_S + c_E\delta_E + c_W\delta_W)$ where I(x, y) is the luminance (Y) plane. In other embodiments, I(x, y) is the chrominance (U) plane or the chrominance (V) plane. The method then decrements (at 650) no_iterations by one and determines (at 655) if no_iterations is equal to 0. If not, the method continues at step 630. If so, the method determines (at 660) if the current pixel location is a last pixel location of the current frame. If not, the method sets (at 665) a next pixel location in the current frame as the current pixel location. The method then continues at step 630.

If the method 600 determines (at 660—Yes) that the current pixel location is the last pixel location of the current frame, the method then determines (at 670) if the current frame is a last frame of the video sequence (received at 605). If not, the method sets (at 675) a next frame in the video sequence as the current frame. The method then continues at step 615. If the method determines (at 670—Yes) that the current frame is the last frame of the video sequence, the method outputs (at 680) a pre-filtered video sequence being comprised of multiple pre-filtered video frames and having an associated data amount that is less than the data amount associated with the original video sequence (received at 605).

The pre-filtered video sequence may be received, for example, by the temporal pre-filtering component 205 for further pre-processing or the encoder component 110 for encoding (i.e., compression). After compression by the encoder component 110, the bit rate of the pre-filtered and compressed video sequence is lower than the bit rate that would be obtained by compressing the original video sequence (without pre-filtering) using the same compression method.

Non-Traditional Perona-Malik Spatial Filtering

Figure 7:
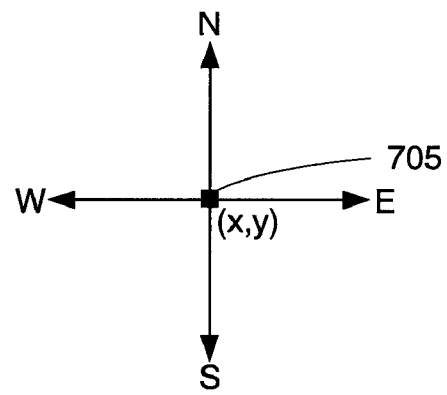
FIG. 7 illustrates a conceptual diagram of a diffusion pattern of a conventional Perona-Malik anisotropic diffusion filter.

FIG. 7 illustrates a conceptual diagram of a diffusion pattern of a conventional Perona-Malik anisotropic diffusion filter. As shown in FIG. 7, a conventional Perona-Malik anisotropic filter performs diffusion on a pixel 705 in only horizontal and vertical directions (north, south, east and west) with respect to the pixel's location (x, y). For example, for a pixel location of (2, 2), a conventional anisotropic diffusion filter will perform diffusion filtering in the horizontal or vertical directions from the pixel location (2, 2) towards the horizontal or vertical neighboring pixel locations (2, 3), (2, 1), (3, 2), and (1, 2).

In some embodiments, spatial diffusion filtering is performed on a pixel in at least one diagonal direction (north-east, north-west, south-east, or south-west) with respect to the pixel's location (x, y). For example, for a pixel location of (2, 2), the method of the present invention performs diffusion filtering in at least one diagonal direction from the pixel location (2, 2) towards the direction of a diagonal neighboring pixel location (3, 3), (1, 3), (3, 1) and/or (1, 1). In other embodiments, diffusion filtering is performed in four diagonal directions (north-east, north-west, south-east, and south-west) with respect to a pixel location (x, y). The various embodiments of spatial diffusion filtering may be performed, for example, by the spatial pre-filtering component 210 or the encoder component 110.

Figure 8:
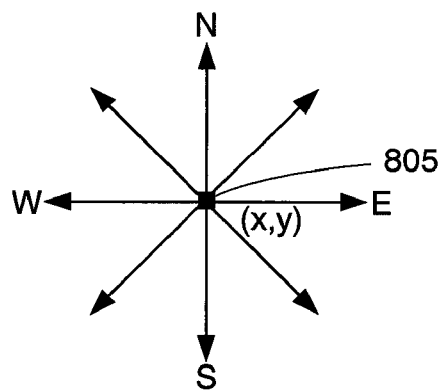
FIG. 8 illustrates a conceptual diagram of a diffusion pattern of an omni-directional anisotropic diffusion filter in accordance with the present invention.

FIG. 8 illustrates a conceptual diagram of a diffusion pattern of an omni-directional anisotropic diffusion filter in accordance with the present invention. As shown in FIG. 8, the omni-directional anisotropic diffusion filter performs diffusion in four horizontal or vertical directions (north, south, east and west) and four diagonal directions (north-east, north-west, south-east, and south-west) with respect to a pixel 805 at pixel location (x, y). For example, for a pixel location of (2, 2), the omni-directional anisotropic diffusion filter will perform diffusion filtering in four horizontal or vertical directions from the pixel location (2, 2) towards the horizontal or vertical neighboring pixel locations (2, 3), (2, 1), (3, 2), and (1, 2) and in four diagonal directions from the pixel location (2, 2) towards the diagonal neighboring pixel locations (3, 3), (1, 3), (3, 1) and (1, 1).

In some embodiments, a video frame is pre-processed using omni-directional diffusion filtering in four horizontal or vertical directions and four diagonal directions as expressed by the following omni-directional spatial filtering equation (shown in two dimensional form):

$$I(x, y, t+1) = I(x, y, t) + \lambda \left[ \sum_{N,S,E,W} c_m(x, y, t)\nabla I_m(x, y, t) + \beta \sum_{NE,SE,SW,NW} c_n(x, y, t)\nabla I_n(x, y, t) \right]$$

where:

$I(x, y, t)$ is a discrete image;

$\nabla I(x, y, t)$ is the image gradient;

(x, y) specifies a pixel location in a discrete, two dimensional grid covering the video frame;

t denotes discrete time steps (i.e., iterations);

scalar constant $\lambda$ determines the rate of diffusion, $\lambda$ being a positive real number that is less than or equal to $$\frac{1}{|\eta(x, y)|},$$

where $|\eta(x, y)|$ is the number of neighboring pixels which is equal to eight (except at the video frame boundaries where it is less than eight) so that $$\lambda \leq \frac{1}{8};$$

and subscripts m and n correspond to the eight directions of diffusion with respect to the pixel location (x, y), where m is a horizontal or vertical direction (N, S, E, W) and n is a diagonal direction (NE, SE, SW, NW).

Notations $c_m$ and $c_n$ are diffusion coefficients where horizontal or vertical directions (N, S, E, W) are indexed by subscript m and diagonal directions (NE, SE, SW, NW) are indexed by subscript n. Each diffusion coefficient is referred to as an edge stopping function g(x) of $\nabla I(x,y,t)$ in the corresponding direction as expressed in the following equations:

$$c_m(x,y,t)=g(\nabla I_m(x,y,t))$$

$$c_n(x,y,t)=g(\nabla I_n(x,y,t))$$

where g(x) satisfies the condition $g(x) \to 0$ when $x \to \infty$ such that the diffusion operation is stopped across the edges of the video frame.

Because the distance between a pixel location (x, y) and any of its diagonal pixel neighbors is larger than the distance between the distance between the pixel location and its horizontal or vertical pixel neighbors, the diagonal pixel differences are scaled by a factor $\beta$, which is a function of the frame dimensions M, N.

Also employed is the approximation of the image gradient $\nabla I(x, y, t)$ in a selected direction as given by the equation:

$$\nabla I_p(x,y,t)=I_p(x,y,t)-I(x,y,t), p \in \eta(x,y).$$

For example, in the northern (N) direction, the image gradient $\nabla I(x, y, t)$ can be computed as a difference given by the equation:

$$\nabla I_N(x,y)=I(x,y+1,t)-I(x,y,t)$$

Various edge-stopping functions g(x) may be used such as:

$$g(x, y, t) = \exp\left[-\left(\frac{\nabla I(x, y, t)}{k}\right)^2\right]$$

or $$g(x, y, t) = \frac{1}{1 + \left(\frac{\nabla I(x, y, t)}{K}\right)^2}.$$

Figure 9:
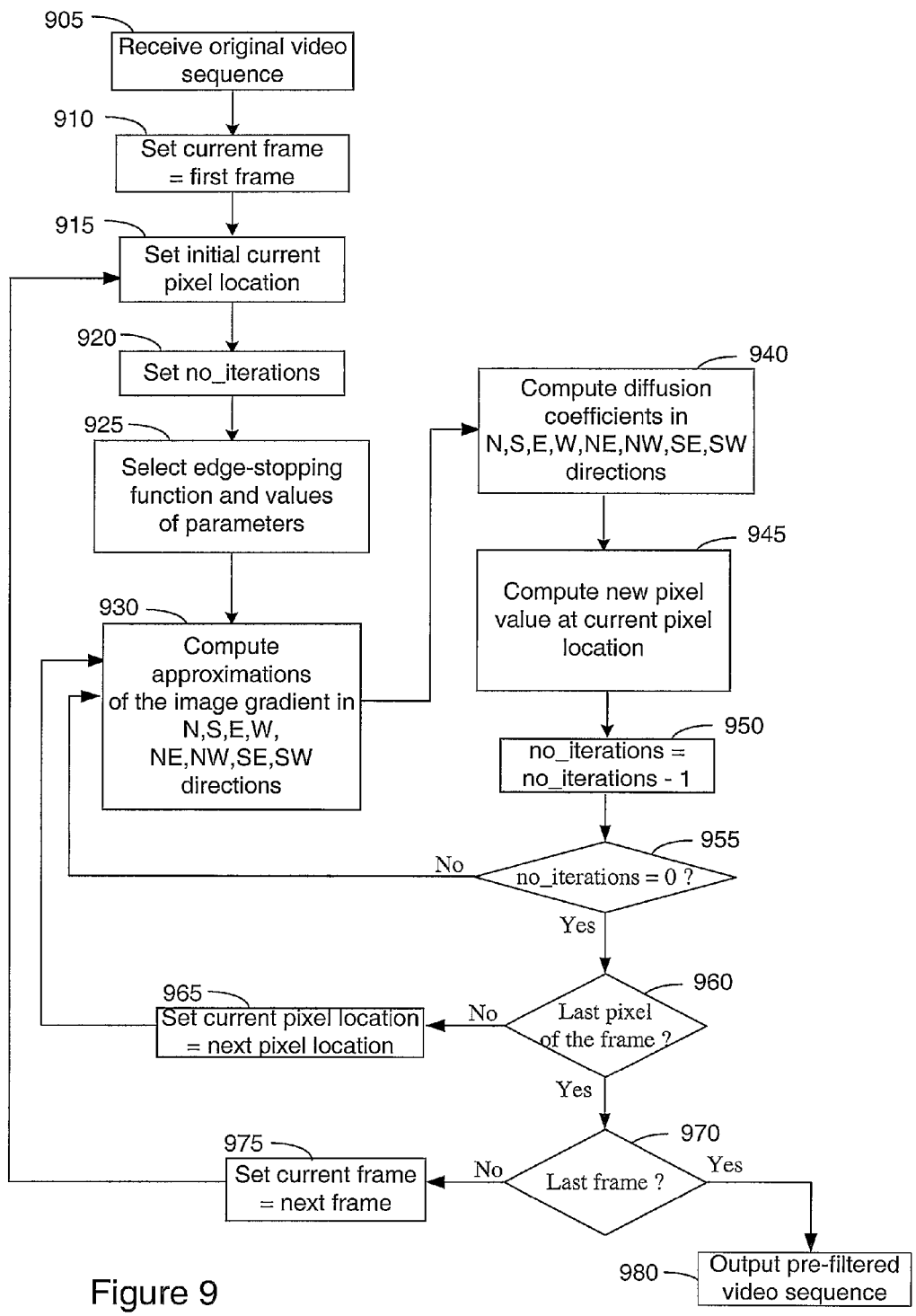
FIG. 9 illustrates a flowchart depicting a method for pre-processing a video sequence using omni-directional spatial anisotropic diffusion filtering for data reduction.

FIG. 9 is a flowchart showing a method 900 for pre-processing a video sequence using omni-directional spatial anisotropic diffusion filtering to reduce the data amount of the video sequence and to reduce the bit rate of the compressed video sequence. The method 900 may be performed, for example, by the spatial pre-filtering component 210 or the encoder component 110.

The method 900 starts when an original video sequence comprised of multiple video frames is received (at 905), the original video sequence having an associated data amount. The method sets (at 910) a first video frame in the video sequence as a current frame. The current frame is comprised of a plurality of pixels at pixel locations where each pixel location contains one or more pixel values (such as luminance and chrominance values). In some embodiments, the luminance values (i.e., the luminance plane) of the current frame are filtered. In other embodiments, the chrominance (U) values (i.e., the chrominance (U) plane) or the chrominance (V) values (i.e., the chrominance (V) plane) of the current frame are filtered. Pixels and pixel locations are identified by discrete row (e.g., x) and column (e.g., y) coordinates such that $1 \leq x \leq M$ and $1 \leq y \leq N$ where M×N is the size of the current frame in pixel units. The method then sets (at 915) row (x) and column (y) values for an initial current pixel location. The method also sets (at 920) the number of iterations (no_iterations), i.e., time steps (t), to be performed for each pixel location (x,y). The number of iterations can be determined depending on the amount of details to be removed.

The method then selects (at 925) an edge-stopping function g(x) and values of parameters (such as $\lambda$ and k). The method then computes (at 930) approximations of the image gradient in the north, south, east, west, north-east, north-west, south-east, and south-west directions ($\delta_N$, $\delta_S$, $\delta_E$, $\delta_W$, $\delta_{NE}$, $\delta_{NW}$, $\delta_{SE}$, and $\delta_{SW}$, respectively) using the equations:

$$c_N(x,y,t)=g(\nabla I_N(x,y,t))$$

$$c_S(x,y,t)=g(\nabla I_S(x,y,t))$$

$$c_E(x,y,t)=g(\nabla I_E(x,y,t))$$

$$c_W(x,y,t)=g(\nabla I_W(x,y,t))$$

$$c_{NE}(x,y,t)=g(\nabla I_{NE}(x,y,t))$$

$$c_{NW}(x,y,t)=g(\nabla I_{NW}(x,y,t))$$

$$c_{SE}(x,y,t)=g(\nabla I_{SE}(x,y,t))$$

$$c_{SW}(x,y,t)=g(\nabla I_{SW}(x,y,t)).$$

The method then computes (at 940) diffusion coefficients in the north, south, east, west, north-east, north-west, south-east, and south-west directions ($c_N$, $c_S$, $c_E$, $c_W$, $c_{NE}$, $c_{NW}$, $c_{SE}$, and $c_{SW}$, respectively) where:

$$c_N=g(\delta_N)$$

$$c_S=g(\delta_S)$$

$$c_E=g(\delta_E)$$

$$c_W=g(\delta_W).$$

$$c_{NE}=g(\delta_{NE})$$

$$c_{NW}=g(\delta_{NW})$$

$$c_{SE}=g(\delta_{SE})$$

$$c_{SW}=g(\delta_{SW}).$$

The method then computes (at 945) a new pixel value for the current pixel location using the equation:

$$I(x, y, t+1) = I(x, y, t) + \lambda\left[\sum_{N,S,E,W} c_m(x, y, t)\nabla I_m(x, y, t) + \beta \sum_{NE,SE,SW,NW} c_n(x, y, t)\nabla I_n(x, y, t)\right]$$

i.e., $I(x, y)=I(x, y)+\lambda[(c_N\delta_N+c_S\delta_S+c_E\delta_E+c_W\delta_W)+\beta(c_{NE}\delta_{NE}+c_{NW}\delta_{NW}+c_{SE}\delta_{SE}+c_{SW}\delta_{SW})]$ where $I(x, y)$ is the luminance (Y) plane. In other embodiments, $I(x, y)$ is the chrominance (U) plane or the chrominance (V) plane.

The method then decrements (at 950) no_iterations by one and determines (at 955) if no_iterations is equal to 0. If not, the method continues at step 930. If so, the method determines (at 960) if the current pixel location is a last pixel location of the current frame. If not, the method sets (at 965) a next pixel location in the current frame as the current pixel location. The method then continues at step 930.

If the method 900 determines (at 960—Yes) that the current pixel location is the last pixel location of the current frame, the method then determines (at 970) if the current frame is a last frame of the video sequence (received at 905). If not, the method sets (at 975) a next frame in the video sequence as the current frame. The method then continues at step 915. If the method determines (at 970—Yes) that the current frame is the last frame of the video sequence, the method outputs (at 980) a pre-filtered video sequence being comprised of multiple pre-filtered video frames and having an associated data amount that is less than the data amount associated with the original video sequence (received at 905).

The pre-filtered video sequence may be received, for example, by the temporal pre-filtering component 205 for further pre-processing or the encoder component 110 for encoding (i.e., compression). The bit rate of the pre-filtered video sequence after compression using the encoder component 110 is lower than the bit rate of the original video sequence (without pre-filtering) after compression using the same compression method.

Section III: Foreground/Background Differentiation Method

In some embodiments, foreground/background differentiation methods are used to pre-filter a video sequence so that filtering is performed differently on a foreground region of a video frame of the video sequence than on a background region of the video frame. Performing different filtering on different regions of the video frame allows a system to provide greater data reduction in unimportant background regions of the video frame while preserving sharp edges in regions-of-interest in the foreground region. In addition, after compression of the pre-processed video sequence, the bit rate of the pre-processed and compressed video sequence will be lower than the bit rate of the compressed video sequence made without pre-processing. This foreground/background differentiation method is especially beneficial in videoconferencing applications but can be used in other applications as well.

The foreground/background differentiation method of the present invention includes five general steps: 1) identifying pixel locations in a video frame having pixel values that match color characteristics of human skin and identification of contiguous groupings of matching pixel locations (i.e., regions-of-interest); 2) determining a bounding shape for each region-of-interest, the totality of all pixel locations contained in a bounding shape comprising a foreground region and all other pixel locations in the frame comprising a background region; 3) creating a binary mask $M_{fg}$ for the foreground region and a binary mask $M_{bg}$ for the background region; 4) filtering the foreground and background regions using different filtering methods or parameters using the binary masks; and 5) combining the filtered foreground and background regions into a single filtered frame. These steps are discussed with reference to FIGS. 10 and 11a through 11d.

Figure 10:
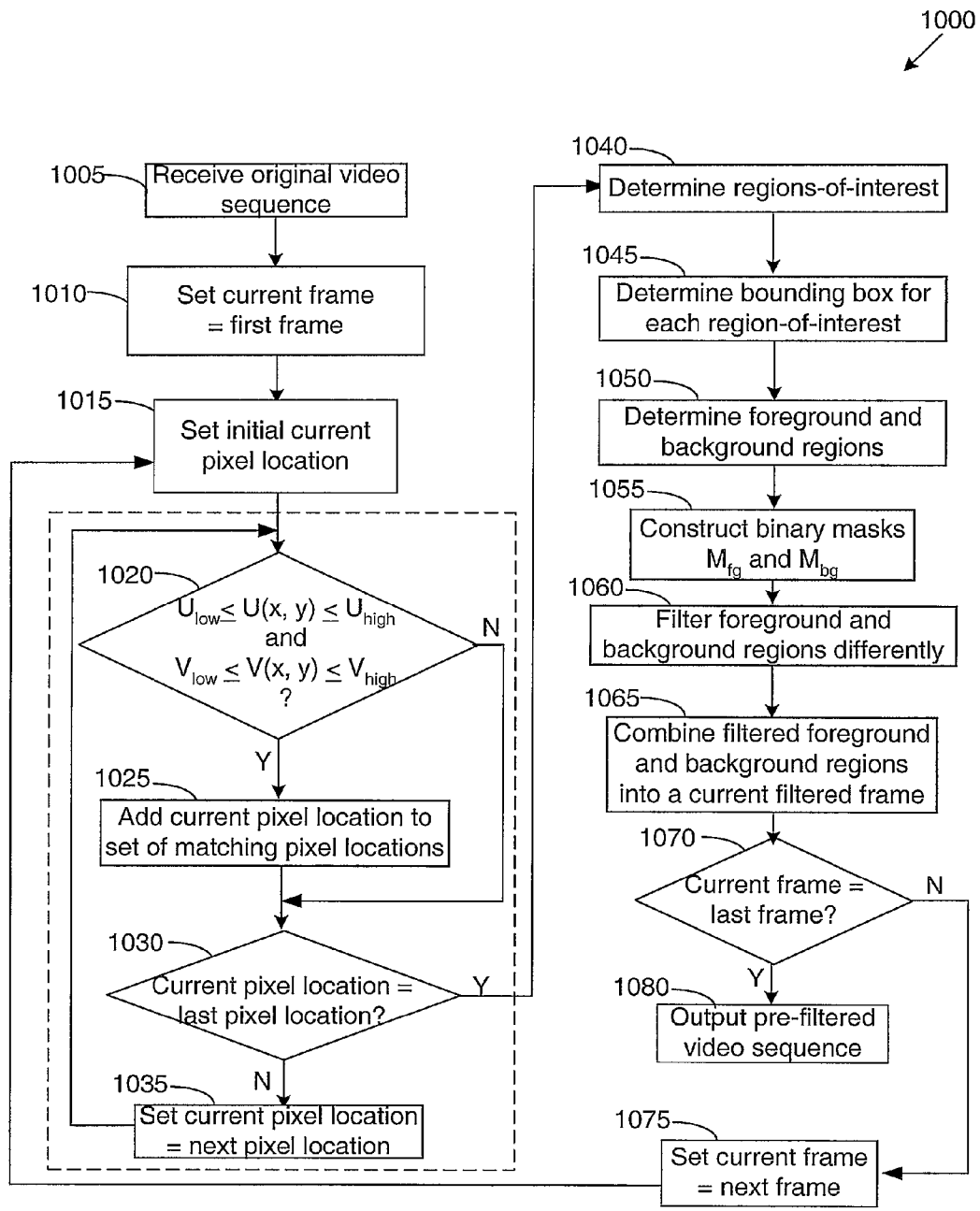
FIG. 10 illustrates a flowchart depicting a foreground/background differentiation method in accordance with the present invention.

FIG. 10 illustrates a flowchart depicting a foreground/background differentiation method 1000 in accordance with the present invention. The foreground/background differentiation method 1000 may be performed, for example, by the spatial pre-filtering component 210 or the encoder component 110. The foreground/background differentiation method 1000 commences by receiving an original video sequence in YUV format (at 1005). The video sequence comprises a plurality of video frames and having an associated data amount. In other embodiments, a video sequence in another format is received. The method then sets (at 1010) a first video frame in the video sequence as a current frame.

The current frame is comprised of a current luminance (Y) frame and current chrominance (U and V) frames. As such, the current frame is comprised of a plurality of pixels at pixel locations where each pixel location contains one or more pixel values (such as luminance and chrominance values from the luminance and chrominance frames, respectively). Pixels and pixel locations are identified by discrete row (e.g., x) and column (e.g., y) coordinates such that $1 \leq x \leq M$ and $1 \leq y \leq N$ where M×N is the size of the current frame in pixel units. The method then sets (at 1015) row (x) and column (y) values for an initial current pixel location. For example, the initial current pixel location may be set to equal (0, 0).

The method then determines (at 1020) if the current pixel location in the current frame contains one or more pixel values that fall within predetermined low and high threshold values. In some embodiments, the method determines if the current pixel location has pixel values that satisfy the condition $U_{low} \leq U(x, y) \leq U_{high}$ and $V_{low} \leq V(x, y) \leq V_{high}$ where U and V are chrominance values of the current pixel location (x, y) and threshold values $U_{low}$, $U_{high}$, $V_{low}$, and $V_{high}$ are predetermined chrominance values that reflect the range of color characteristics (i.e., chrominance values U, V) of human skin. As such, the present invention makes use of the fact that, for all human races, the chrominance ranges of the human face/skin are consistently the same. In some embodiments, the following predetermined threshold values are used: $U_{low}=75$, $U_{high}=130$, $V_{low}=130$, and $V_{high}=160$. In other embodiments, the method includes identifying pixel locations in the video frame having pixel values that match other characteristics, such as a predetermined color or brightness. If the method determines (at 1020—Yes) that the current pixel location contains pixel values that fall within the predetermined low and high threshold values, the current pixel location is referred to as a matching pixel location and is added (at 1025) to a set of matching pixel locations. Otherwise, the method proceeds directly to step 1030.

The foreground/background differentiation method 1000 determines (at 1030) if the current pixel location is a last pixel location of the current frame. For example, the method may determine whether the row (x) coordinate of the current pixel location is equal to M and the column (y) coordinate of the current pixel location is equal to N where M×N is the size of the current frame in pixel units. If not, the method sets (at 1035) a next pixel location in the current frame as the current pixel location. The method then continues at step 1020. As described above, steps 1020 through 1035 compose a human skin identifying system that identifies pixel locations in a video frame having pixel values that match characteristics of human skin. Other human skin identifying systems well known in the art, however, may be used in place of the human skin identifying system described herein without departing from the scope of the invention.

If the method 1000 determines (at 1030—Yes) that the current pixel location is the last pixel location of the current frame, the method then determines (at 1040) contiguous groupings of matching pixel locations in the set of matching pixel locations. Each contiguous grouping of matching pixel locations is referred to as a region-of-interest (ROI). A region-of-interest can be defined, for example, by spatial proximity wherein all matching pixel locations within a specified distance are grouped in the same region-of-interest.

Figure 11A:
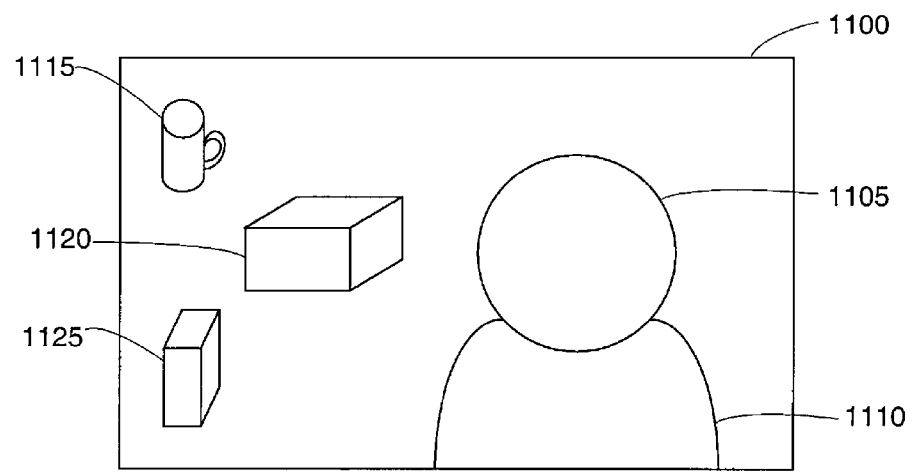
FIG. 11a illustrates an example of a video frame having two regions-of-interest.

An ROI is typically a distinct entity represented in the current frame, such as a person's face or an object (e.g., cup) having chrominance values similar to that of human skin. FIG. 11*a* illustrates an example of a video frame 1100 having two ROIs. The first ROI represents a person's face 1105 and the second ROI represents a cup 1115 having chrominance values similar to that of human skin (i.e., having chrominance values that fall within the predetermined chrominance threshold values). Also shown in FIG. 11*a* are representations of a person's clothed body 1110, a carton 1120, and a book 1125, none of which have chrominance values similar to that of human skin.

A bounding shape is then determined (at 1045) for each ROI, the bounding shape enclosing all or a portion of the ROI (i.e., the bounding shape encloses all or some of the matching pixel locations in the ROI). The bounding shape may be of various geometric forms, such as a four-sided, three-sided, or circular form. In some embodiments, the bounding shape is a in the form of a box where a first side of the bounding shape is determined by the lowest x coordinate, a second side of the bounding shape is determined by the highest x coordinate, a third side of the bounding shape is determined by the lowest y coordinate, and a fourth side of the bounding shape is determined by the highest y coordinate of the matching pixel locations in the ROI. In other embodiments, the bounding shape does not enclose the entire ROI and encloses over ½ or ¾ of the matching pixel locations in the ROI.

Figure 11B:
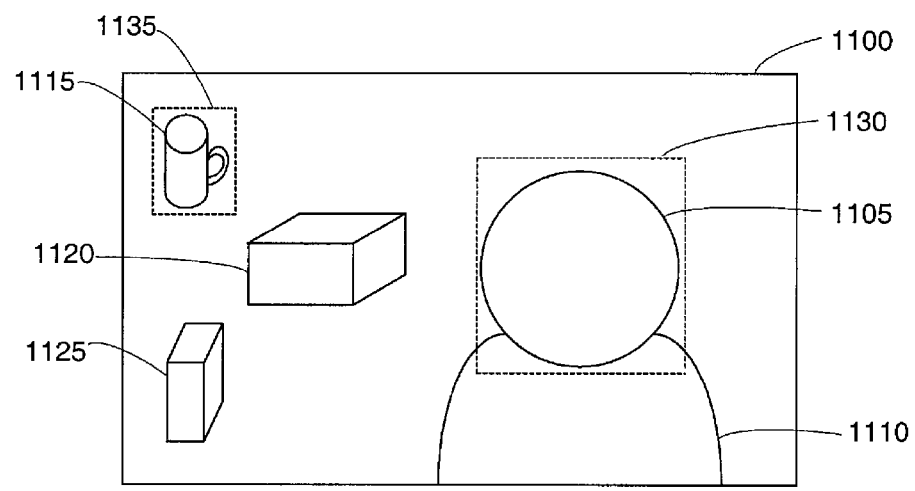
FIG. 11b illustrates an example of a video frame having two regions-of-interest, each region-of-interest being enclosed by a bounding shape.

FIG. 11*b* illustrates an example of a video frame 1100 having two ROIs, each ROI being enclosed by a bounding shape. The first ROI (the person's face 1105) is enclosed by a first bounding shape 1130 and the second ROI (the cup 1115) is enclosed by a second bounding shape 1135. Use of a bounding shape for each ROI gives a fast and simple approximation of an ROI in the video frame 1100. Being an approximation of an ROI, a bounding shape will typically enclose a number of non-matching pixel locations along with the matching pixel locations of the ROI.

The method then determines (at 1050) foreground and background regions of the current frame. The foreground region is comprised of a totality of regions in the current frame enclosed within a bounding shape. In other words, the foreground region is comprised of a set of foreground pixel locations (matching or non-matching) of the current frame enclosed within a bounding shape. In the example shown in FIG. 11*b*, the foreground region is comprised of the totality of the regions or pixel locations enclosed by the first bounding shape 1130 and the second bounding shape 1135. The background region is comprised of a totality of regions in the current frame not enclosed within a bounding shape. In other words, the background region is comprised of a set of background pixel locations not included in the foreground region. In the example shown in FIG. 11*b*, the background region is comprised of the regions or pixel locations not enclosed by the first bounding shape 1130 and the second bounding shape 1135.

Figure 11C:
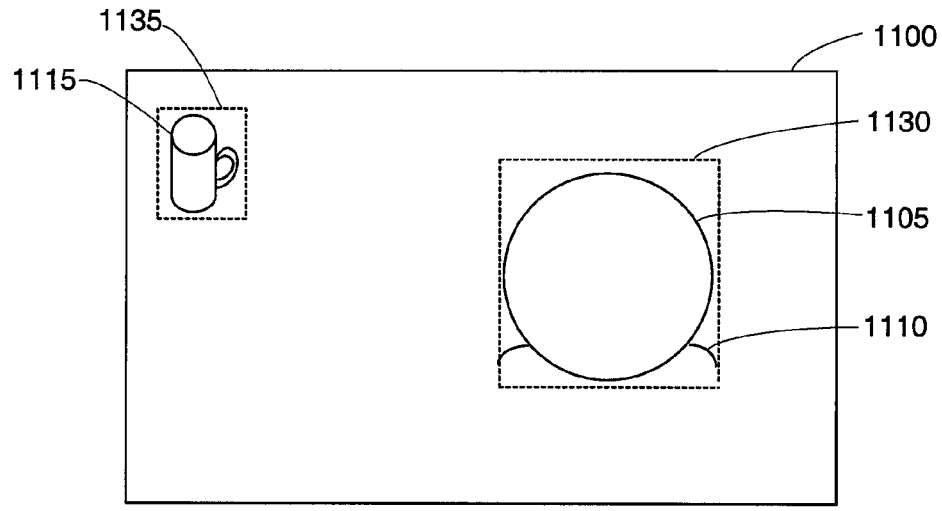
FIG. 11c illustrates a video frame after a foreground binary mask $M_{fg}$ has been applied.

The method then constructs (at 1055) a binary mask $M_{fg}$ for the foreground region and a binary mask $M_{bg}$ for the background region. In some embodiments, the foreground binary mask $M_{fg}$ is defined to contain values equal to 1 at pixel locations in the foreground region and to contain values equal to 0 at pixel locations not in the background region. FIG. 11*c* illustrates the video frame 1100 after a foreground binary mask $M_{fg}$ has been applied. As shown in FIG. 11*c*, application of the foreground binary mask $M_{fg}$ removes the background region so that only the set of foreground pixel locations or the foreground region (i.e., the regions enclosed by the first bounding shape 1130 and the second bounding shape 1135) of the frame remains.

Figure 11D:
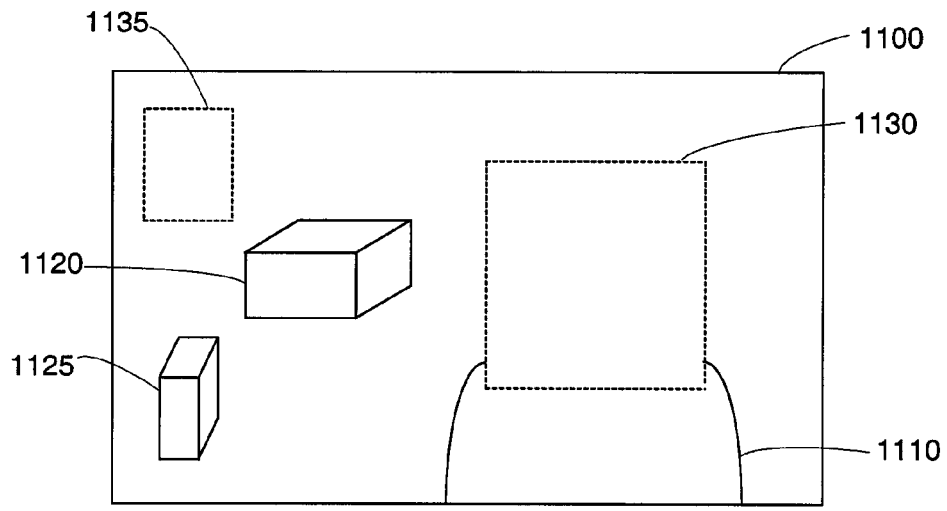
FIG. 11d illustrates a video frame after a background binary mask $M_{bg}$ has been applied.

The background binary mask $M_{bg}$ is defined as the complement of the foreground binary mask $M_{fg}$ so that it contains values equal to 0 at pixel locations in the foreground region and contains values equal to 1 at pixel locations not in the background region. FIG. 11*d* illustrates the video frame 1100 after a background binary mask $M_{bg}$ has been applied. As shown in FIG. 11*d*, application of the background binary mask $M_{bg}$ removes the foreground region so that only the set of background pixel locations or the background region (i.e., the regions not enclosed by the first bounding shape 1130 and the second bounding shape 1135) of the frame remains.

Using the binary masks $M_{fg}$ and $M_{bg}$, the method then performs (at 1060) different filtering of the foreground and background regions (i.e., the set of foreground pixel locations and the set of background pixel locations are filtered differently). In some embodiments, foreground and background regions are filtered using anisotropic diffusion where different edge stopping functions and/or parameter values are used for the foreground and background regions. Conventional anisotropic diffusion methods may be used, or an improved omni-directional anisotropic diffusion method (as described with reference to FIGS. 8 and 12) may be used to filter the foreground and background regions. In other embodiments, other filtering methods are used and applied differently to the foreground and background regions. The filtered foreground and background regions are then combined (at 1065) to form a current filtered frame.

The foreground/background differentiation method 1000 then determines (at 1070) if the current frame is a last frame of the video sequence (received at 1005). If not, the method sets (at 1075) a next frame in the video sequence as the current frame. The method then continues at step 1015. If the method 1000 determines (at 1070—Yes) that the current frame is the last frame of the video sequence, the method outputs (at 1080) a pre-filtered video sequence being comprised of multiple pre-filtered video frames and having an associated data amount that is less than the data amount associated with the original video sequence (received at 1005).

The pre-filtered video sequence may be received, for example, by the temporal pre-filtering component 205 for further pre-processing or the encoder component 110 for encoding (i.e., compression). The bit rate of the pre-filtered video sequence after compression using the encoder component 110 is lower than the bit rate of the video sequence without pre-filtering after compression using the same compression method.

The foreground and background regions may be filtered using different filtering methods or different filtering parameters. Among spatial filtering methods, diffusion filtering has the important property of generating a scale space via a partial differential equation. In the scale space, analysis of object boundaries and other information at the correct resolution where they are most visible can be performed. Anisotropic diffusion methods have been shown to be particularly effective because of their ability to reduce details in images without impairing the subjective quality. In other embodiments, other filtering methods are used to filter the foreground and background regions differently.

Figure 12:
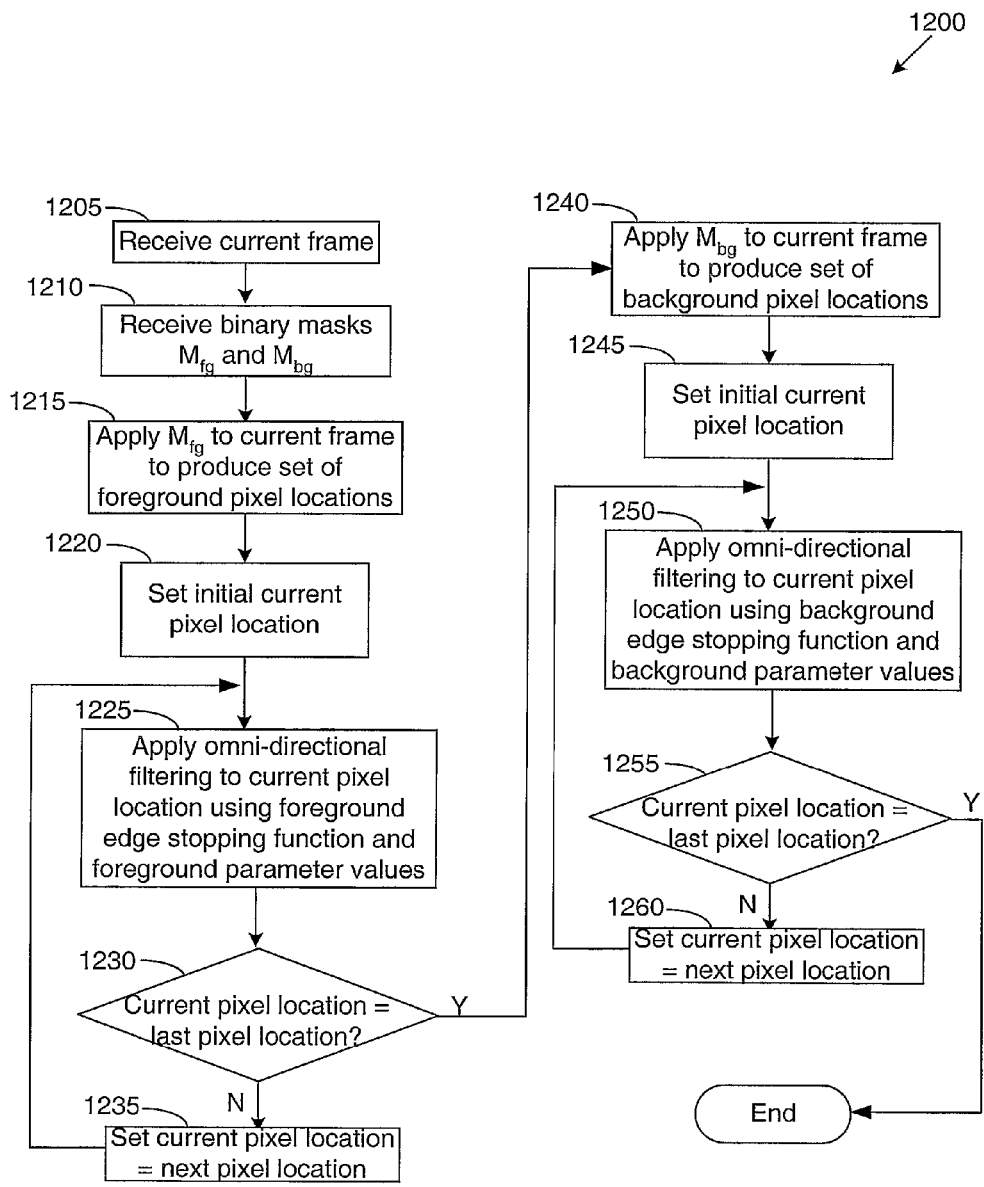
FIG. 12 is a flowchart of a method for using omni-directional spatial filtering in conjunction with the foreground/background differentiation method of FIG. 10.

FIG. 12 illustrates a flowchart of a method 1200 for using omni-directional spatial filtering method (described with reference to FIG. 9) in conjunction with the foreground/background differentiation method 1000 (described with reference to FIG. 10). The method 1200 may be performed, for example, by the spatial pre-filtering component 210 or the encoder component 110.

The method 1200 begins when it receives (at 1205) a video frame (i.e., the current frame being processed by the method 1000). The current frame is comprised of a plurality of pixels at pixel locations where each pixel location contains one or more pixel values. Pixel locations are identified by discrete row (x) and column (y) coordinates such that $1 \leq x \leq M$ and $1 \leq y \leq N$ where M×N is the size of the frame in pixel units.

The method 1200 also receives (at 1210) a foreground binary mask $M_{fg}$ and a background binary mask $M_{bg}$ (constructed at step 1055 of FIG. 10). The method 1200 then applies (at 1215) the foreground binary mask $M_{fg}$ to the current frame to produce a set of foreground pixel locations that comprise the foreground region (as shown, for example, in FIG. 11c). The method then sets (at 1220) row (x) and column (y) values for an initial current pixel location to equal the coordinates of one of the foreground pixel locations. For example, the initial current pixel location may be set to equal the coordinates of a foreground pixel location having the lowest row (x) or the lowest column (y) coordinate in the set of foreground pixel locations.

The method 1200 then applies (at 1225) omni-directional diffusion filtering to the current pixel location using a foreground edge stopping function $g_{fg}(x)$ and a set of foreground parameter values $P_{fg}$ (that includes parameter values $k_{fg}$ and $\lambda_{fg}$). The omni-directional diffusion filtering is expressed by the omni-directional spatial filtering equation:

$$I(x, y, t+1) = I(x, y, t) + \lambda \left[ \sum_{N,S,E,W} c_m(x, y, t) \nabla I_m(x, y, t) + \beta \sum_{NE,SE,SW,NW} c_n(x, y, t) \nabla I_n(x, y, t) \right].$$

Parameter value $\lambda_{fg}$ is a foreground parameter value that determines the rate of diffusion in the omni-directional spatial filtering in the foreground region. In some embodiments, the foreground edge stopping function $g_{fg}(x)$ is expressed by the following equation:

$$g(x, y, t) = \exp\left[-\left(\frac{\nabla I(x, y, t)}{k_{fg}}\right)^2\right]$$

where parameter value $k_{fg}$ is a foreground parameter value that controls diffusion as a function of the gradient. If the value of the parameter is low, diffusion stops across the edges. If the value of the parameter is high, intensity gradients have a reduced influence on diffusion.

The method 1200 then determines (at 1230) if the current pixel location is a last pixel location of the set of foreground pixel locations. If not, the method sets (at 1235) a next pixel location in the set of foreground pixel locations as the current pixel location. The method then continues at step 1225. If the method 1200 determines (at 1230—Yes) that the current pixel location is the last pixel location of the set of foreground pixel locations, the method continues at step 1240.

The method 1200 applies (at 1240) the background binary mask $M_{bg}$ to the current frame to produce a set of background pixel locations that comprise the background region (as shown, for example, in FIG. 11d). The method then sets (at 1245) row (x) and column (y) values for an initial current pixel location to equal the coordinates of one of the background pixel locations. For example, the initial current pixel location may be set to equal the coordinates of a background pixel location having the lowest row (x) or the lowest column (y) coordinate in the set of background pixel locations.

The method 1200 then applies (at 1250) omni-directional diffusion filtering to the current pixel location using a background edge stopping function $g_{bg}(x)$ and a set of background parameter values $P_{bg}$ (that includes parameter values $k_{bg}$ and $\lambda_{bg}$). The omni-directional diffusion filtering is expressed by the omni-directional spatial filtering equation given above. In some embodiments, at least one background parameter value in the set of background parameters $P_{bg}$ is not equal to a corresponding foreground parameter value in the set of foreground parameters $P_{fg}$. Parameter value $\lambda_{bg}$ is a background parameter value that determines the rate of diffusion in the omni-directional spatial filtering in the background region. In some embodiments, the background parameter value $\lambda_{bg}$ is not equal to the foreground parameter value $\lambda_{fg}$.

In some embodiments, the background edge stopping function $g_{bg}(x)$ is different than the foreground edge stopping function $g_{fg}(x)$ and is expressed by the following equation:

$$g(x, y, t) = \frac{1}{1 + \left(\frac{\nabla I(x, y, t)}{k_{bg}}\right)^2}$$

where parameter value $k_{bg}$ is a background parameter value that controls diffusion as a function of the gradient. If the value of this parameter is low, diffusion stops across the edges. If the value of this parameter is high, intensity gradients have a reduced influence on diffusion. In some embodiments, the background parameter value $k_{bg}$ is not equal to the foreground parameter value $k_{fg}$.

The method 1200 then determines (at 1255) if the current pixel location is a last pixel location of the set of background pixel locations. If not, the method sets (at 1260) a next pixel location in the set of background pixel locations as the current pixel location. The method then continues at step 1250. If the method 1200 determines (at 1255—Yes) that the current pixel location is the last pixel location of the set of background pixel locations, the method ends.

Different embodiments of the present invention as described above may be used independently to pre-process a video sequence or may be used in any combination with any other embodiment of the present invention and in any sequence. As such, the temporal filtering method of the present invention may be used independently or in conjunction with the spatial filtering methods and/or the foreground/background differentiation methods of the present invention to pre-process a video sequence. In addition, the spatial filtering methods of the present invention may be used independently or in conjunction with the temporal filtering methods and/or the foreground/background differentiation methods of the present invention to pre-process a video sequence. Furthermore, the foreground/background differentiation method of the present invention may be used independently or in conjunction with the temporal filtering methods and/or the spatial filtering methods of the present invention to pre-process a video sequence.

Some embodiments described above relate to video frames in YUV format. One of ordinary skill in the art, however, will realize that these embodiments may also relate to a variety of formats other than YUV. In addition, other video frame formats (such as RGB) can easily be changed into YUV format. Some embodiments described above relate to a videoconferencing application. One of ordinary skill in the art, however, will realize that these embodiments may also relate to other applications (e.g., DVD, digital storage media, television broadcasting, internet streaming, communication, etc.) in real-time or post-time. Embodiments of the present invention may also be used with video sequences having different coding standards such as H.263 and H.264 (also known as MPEG-4/Part 10).

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for pre filtering processing an original video sequence, the original video sequence comprising a plurality of video frames, the method comprising:
   for each video frame of the plurality of video frames of the original video sequence:
      identifying a bounding geometric shape that encloses at least a portion of an important region-of-interest in the video frame, the bounding geometric shape serving as a foreground region;
      identifying a portion of the video frame outside the bounding geometric shape as an unimportant background region;
      applying a first filter operation in the foreground region and not in the background region, the first filter operation providing data reduction in the foreground region; and
      applying a second filter operation in the background region and not in the foreground region, the second filter operation providing greater data reduction in the unimportant background region than the first filter operation would provide if applied to a same region; and
   encoding the plurality of video frames after the first and second filter operations have been applied to each of the plurality of video frames.

2. The method of claim 1, wherein the bounding geometric shape comprises one of at least four-sided, three-sided, and circular form.

3. The method of claim 1, wherein each video frame comprises a plurality of pixel locations, wherein each pixel location in the region-of-interest has a chrominance value within a predetermined low chrominance threshold value and a predetermined high chrominance threshold value.

4. The method of claim 1, wherein each video frame comprises a plurality of pixel locations, wherein the bounding geometric shape encloses over ½ of pixel locations in the region-of-interest.

5. The method of claim 1, wherein the first filter operation provides data reduction while preserving sharp edges in the foreground region.

6. The method of claim 1, wherein each video frame comprises a plurality of pixel locations, wherein each pixel location comprises a pixel value, the method further comprising identifying pixel locations that have pixel values in a range of a human skin tone to identify the bounding geometric shape.

7. The method of claim 1, wherein the bounding geometric shape that encloses at least a portion of the region-of-interest is an approximation of the region-of-interest.

8. A method for processing an original video sequence, the original video sequence comprising a plurality of video frames, each video frame comprising a plurality of pixel locations, the method comprising:
   for each video frame:
      specifying a bounding shape that encloses at least a portion of a region-of-interest in the video frame from the plurality of video frames of the original video sequence;
      filtering pixel locations in the bounding shape differently than other pixel locations in the video frame;
   outputting a pre-filtered video sequence comprising a plurality of pre-filtered video frames; and
   compressing the pre-filtered video sequence using a compression method to produce a pre-filtered and compressed video sequence, wherein a bit rate associated with the pre-filtered and compressed video sequence is lower than a bit rate that would result from compressing the original video sequence using the compression method without performing the specifying of the bounding shape and the filtering of pixel locations.

9. The method of claim 8, wherein said filtering pixel locations in the bounding shape differently is for providing a greater data reduction of unimportant regions outside the bounding shape while preserving sharp edges for regions in the bounding shape.

10. The method of claim 8, wherein the region-of-interest comprises pixel locations having pixel values that match characteristics of a human skin.

11. The method of claim 8, wherein the region-of-interest comprises contiguous groupings of matching pixel locations.

12. The method of claim 8, wherein the region-of-interest is defined by a spatial proximity, wherein matching pixel locations within a specified distance are grouped together in the region-of-interest.

13. The method of claim 8, wherein the bounding shape is a geometric shape utilized to quickly bound the region-of-interest in the video frame.

14. A non-transitory computer readable storage medium storing a computer program for pre-filtering an original video sequence, the original video sequence comprising a plurality of video frames, the computer program executable by at least one processor, the computer program comprising sets of instructions for:
specifying a bounding geometric shape that encloses at least a portion of a region-of-interest of a video frame from the plurality of video frames of the original video sequence; and
applying a pre-filter operation to a region outside the bounding geometric shape and not to a region bounded by the bounding geometric shape, the pre-filter operation for reducing data content of unimportant regions in the video frame while preserving sharp edges inside the bounding geometric shape.

15. The non-transitory computer readable storage medium of claim 14, wherein each video frame comprises a plurality of pixel locations, wherein each pixel location in the region-of-interest has a chrominance value within a predetermined low chrominance threshold value and a predetermined high chrominance threshold value.

16. The computer readable storage medium of claim 14, wherein the region-of-interest comprises a totality of regions in the video frame enclosed within multiple bounding shapes.

17. The computer readable storage medium of claim 16, wherein a background region is comprised of a totality of regions in the video frame not enclosed within the multiple bounding shapes and the pre-filter operation is applied to the background region.

18. The computer readable storage medium of claim 14 further comprising a set of instructions for applying a different pre-filter operation to regions inside the bounding geometric shape and not to the region outside of the bounding geometric shape.

19. A method for processing a plurality of video frames, each video frame comprising a plurality of pixel locations, each pixel location comprising a pixel value, the method comprising:
automatically identifying a foreground region for a video frame by identifying a bounding geometric shape that encloses at least a portion of a region-of-interest in the video frame and associating a region enclosed by the bounding geometric shape with the foreground region;
identifying a region outside the geometric bounding shape as a background region of the video frame;
filtering the background region and not the foreground region with a pre-filter operation, the pre-filter operation for reducing data content of unimportant regions in the video frame while preserving sharp edges inside the bounding geometric shape; and
after filtering the background region in the video frame, encoding the video frame.

20. The method of claim 19, wherein automatically identifying the foreground region comprises identifying a set of pixel locations that comprises pixel values between a minimum chrominance value and a maximum chrominance value.

21. The method of claim 20, wherein the minimum and maximum chrominance values are defined by a chrominance range for a human face or skin.

22. A method for pre-filtering a plurality of video frames to reduce data content for encoding, each video frame comprising a plurality of pixel locations, each pixel location comprising first and second pixel values, the method comprising:
automatically identifying a foreground region for a video frame by identifying a region-of-interest in the video frame and associating the region-of-interest with the foreground region, wherein automatically identifying the foreground region comprises identifying, from the plurality of pixel locations, a set of pixel locations that each comprises (i) a first pixel value between a first minimum chrominance value and a first maximum chrominance value, and (ii) a second pixel value between a second minimum chrominance value and a second maximum chrominance value;
identifying a background region of the video frame as pixel locations not in the foreground region; and
filtering the video frame by filtering the foreground region and the background region differently.

23. The method of claim 22, wherein automatically identifying the foreground region comprises specifying a bounding shape for at least a portion of the region-of-interest of the video frame.

24. The method of claim 22, wherein automatically identifying the foreground region comprises:
identifying a plurality of regions in the video frame; and
identifying the foreground region as a totality of said plurality of regions.

25. The method of claim 22 further comprising combining the filtered background region and the filtered foreground region into a single filtered video frame.

26. The method of claim 22, wherein said filtering the foreground region and the background region differently is for achieving a greater data reduction of the background region containing unimportant images over the foreground region containing important images in the video frame.

27. A method for pre-filtering a plurality of video frames for a video conference, wherein each video frame comprises a plurality of pixel locations, the method comprising:
identifying a region-of-interest of a video frame of the plurality of video frames by identifying a plurality of pixel locations having attributes similar to a human skin tone;
bounding, with a bounding geometric shape, an approximation of the region-of-interest to identify a foreground region as a region within the bounding geometric shape;
defining a first binary mask for a pixel locations inside the bounding geometric shape;
defining a second binary mask for a background region for the video frame, the background region covering pixel locations outside the bounding geometric shape;
filtering the video frame by using the first binary mask to filter the foreground region using a first pre-filter operation and using the second binary mask to filter the background region using a second pre-filter operation; and
combining the filtered foreground region and the filtered background region to form a single filtered video frame.

28. The method of claim 27, wherein the foreground region comprises a first set of pixel locations, and the background region comprises a second set of pixel locations.

29. The method of claim 28, wherein the first binary mask comprises a plurality of values, each value corresponding to a pixel location of the video frame, wherein the value is a value of 1 for each pixel location from the first set of pixel locations, wherein the value is a value of 0 for each pixel location from the second set of pixel locations.

30. The method of claim 28, wherein the second binary mask comprises a plurality of values, each value corresponding to a pixel location of the video frame, wherein the value is a value of 1 for each pixel location from the second set of pixel locations, wherein the value is a value of 0 for each pixel location from the first set of pixel locations.

31. The method of claim 27, wherein the foreground region is filtered differently than the background region so that image data is reduced in the background region containing unimportant images more than the foreground region containing important images in the video frame.

32. The method of claim 27, wherein the plurality of pixel locations having attributes similar to the human skin tone comprises pixel locations with pixel values approximating the human skin tone.

* * * * *

UNITED STATES PATENT AND TRADEMARK OFFICE
CERTIFICATE OF CORRECTION

PATENT NO.       : 7,809,207 B2
APPLICATION NO.  : 12/185777
DATED            : October 5, 2010
INVENTOR(S)      : Adriana Dumitras et al.

It is certified that error appears in the above-identified patent and that said Letters Patent is hereby corrected as shown below:

On sheet 2 of 11, in Figure 3, Ref. Numeral 315, line 1, delete "(u)" and insert -- ($\mu$) --, therefor.

On sheet 2 of 11, in Figure 3, Ref. Numeral 320, line 1, delete "(u)," and insert -- ($\mu$), --, therefor.

In column 10, line 5, delete " $c\theta_H^{luma} + d,|$ " and insert -- $c\theta_{luma}^H + d,$ --, therefor.

In column 10, line 9, delete "$u_2, u_3,$" and insert -- $\mu_2, \mu_3$ --, therefor.

In column 10, line 13, delete "$u_2$ and $u_3$" and insert -- $\mu_2$ and $\mu_3$ --, therefor.

In column 10, line 17, delete "$u_2, u_3,$" and insert -- $\mu_2, \mu_3,$ --, therefor.

In column 11, line 58, after " $\Delta A(t+1) = \int \int |\nabla h(x, y, t+1)| - |\nabla h(x, y, t)| \, dx \, dy$ " insert -- . --.

In column 14, line 12, delete "edge stopping" and insert -- edge-stopping --, therefor.

In column 14, line 48, delete "edge stopping" and insert -- edge-stopping --, therefor.

In column 18, line 1, delete "edge stopping" and insert -- edge-stopping --, therefor.

In column 25, line 1, delete "edge stopping" and insert -- edge-stopping --, therefor.

In column 25, line 2, delete "edge stopping" and insert -- edge-stopping --, therefor.

In column 26, line 2, in claim 1, after "for" delete "pre filtering".

In column 28, line 61, in claim 27, after "for" delete "a".

Signed and Sealed this
Twenty-second Day of November, 2011

David J. Kappos
*Director of the United States Patent and Trademark Office*